United States Patent [19]

Frese

[11] Patent Number: 5,047,631

[45] Date of Patent: Sep. 10, 1991

[54] SELF-REFERENCING START OF PLOT SYSTEM AND METHOD

[75] Inventor: Dale C. Frese, San Jose, Calif.

[73] Assignee: Synergy Computer Graphics Corporation, Sunnyvale, Calif.

[21] Appl. No.: 455,687

[22] Filed: Dec. 22, 1989

[51] Int. Cl.[5] .......... H01J 3/14

[52] U.S. Cl. .......... 250/237 G; 250/231.17

[58] Field of Search .......... 250/548, 557, 237 G, 250/231.17; 353/26 A; 356/395

[56] References Cited

U.S. PATENT DOCUMENTS

| | | | |
|---|---|---|---|
| 4,448,503 | 5/1984 | Axelrod et al. | 353/26 A |
| 4,549,084 | 10/1985 | Markle | 250/557 |
| 4,731,542 | 5/1988 | Doggett | 250/548 |
| 4,808,832 | 2/1989 | Doggett | 365/203 |

*Primary Examiner*—David C. Nelms

*Assistant Examiner*—Khaled Shami

*Attorney, Agent, or Firm*—Skjerven, Morrill, MacPherson, Franklin & Friel

[57] ABSTRACT

A start of plot mark consists of three portions, a first, second and third portion each of equal area with the first and second portions being above a reference line and spaced from each other by the second portion which is below the reference line. The first and second portions are used to generate a reference signal for use in measuring the zero crossing of the output signal from the start of plot mark thereby to automatically compensate for uncertainties in the zero crossing such as those uncertainties produced by differences in intensities of the start of plot coloration versus the background coloration of the print medium, differences in reflectivity and illumination of the print medium, and imbalances between sensor output signals.

52 Claims, 18 Drawing Sheets

Cross Over= 1/2(Lev.A +Lev.B)

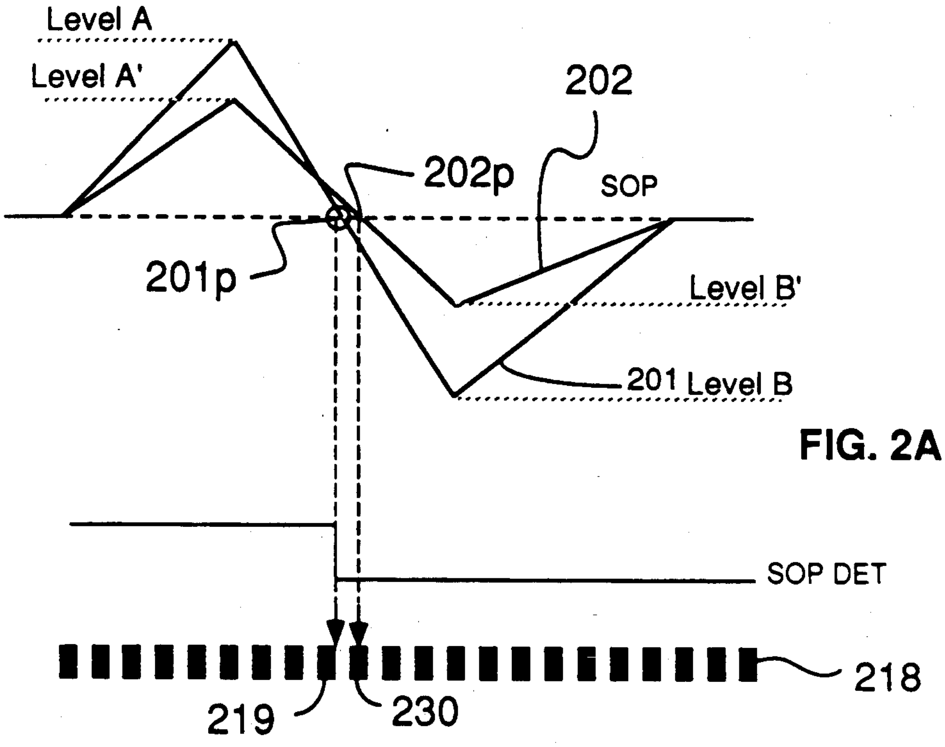
FIG. 2A
FIG. 2B
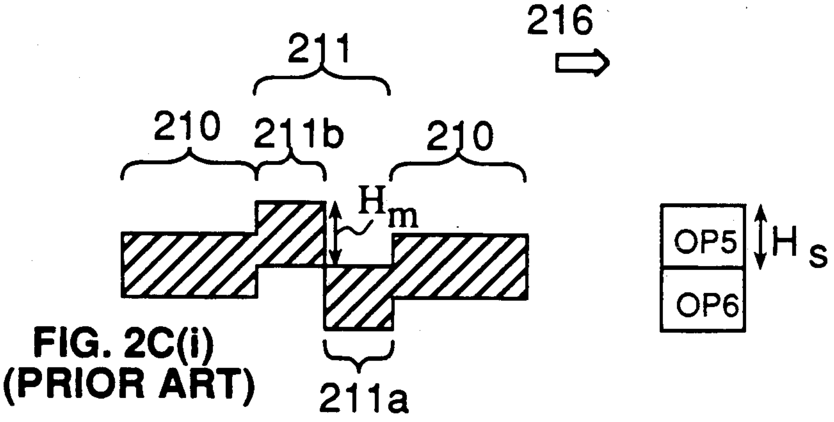
FIG. 2C(i)
(PRIOR ART)
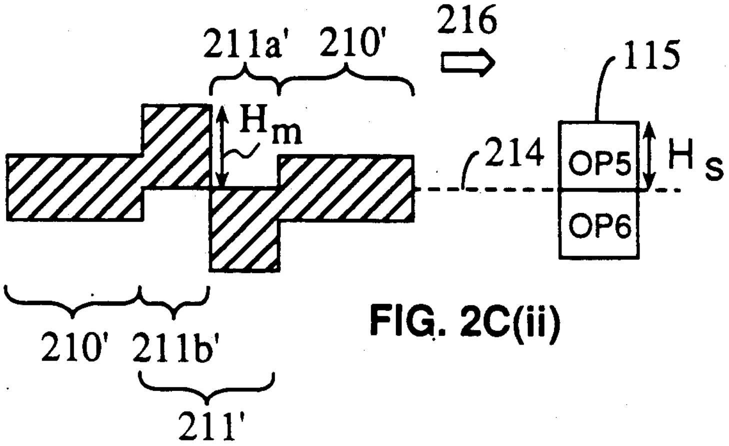
FIG. 2C(ii)

KEY TO FIGURE 3

| FIG.3(1) | FIG.3(2) |
|---|---|

SELF-REFERENCING START OF PLOT SYSTEM AND METHOD

FIELD OF THE INVENTION

This invention relates to electrostatic printers and in particular to a system and method for achieving accurate start of plot ("SOP") on an electrostatic printer.

DESCRIPTION OF THE PRIOR ART

A system and method for activating an operating element, such as the stylii in an electrostatic print head, with respect to a moving substrate and, in particular, in conjunction with an electrostatic printer is disclosed in U.S. Pat. No. 4,731,542, issued Mar. 15, 1988, on an application of David E. Doggett. In the '542 patent, an operating element is activated with respect to a moving substrate by utilizing a tracking line or control track formed on the substrate wherein the tracking line has an activation mark ("start of plot" mark, or SOP mark) formed therein which reflects light of an intensity which is distinguishable from that reflected from the remainder of the tracking line. A photosensor is then mounted relative to the tracking line to sense the intensity of light reflected from the tracking line when the substrate is moving. An output signal, commonly called a "start of plot" signal or "SOP", is generated by the photosensor to indicate the passage of the SOP mark past the photosensor. The SOP signal from the photosensor then activates the operating element. The '542 structure is particularly useful in an electrostatic printer to indicate the start of plot when a paper is passing the printhead on the printer.

In an electrostatic printer, typically the paper on which a plot is to be formed contains along one margin a plurality of closely spaced alternating black and white lines. These lines, sometimes called "indicia", or colloquially "tick marks", are, in some embodiments, very closely spaced on the paper (i.e., spaced 0.010" apart) although they can be spaced reasonably far apart also depending upon the circuitry and software with which they are designed to operate. FIG. 12 in the '542 patent illustrates the SOP marks which generate the SOP signal. In one embodiment, two tracking lines are used, one on each side of the print medium. Pairs of SOP marks are formed simultaneously on the tracking lines, with the members of each pair on opposite sides of the print medium. If the medium is aligned with respect to the sensors on each side, both members should move past the sensors simultaneously. However, if the pair of SOP marks is misaligned, one member of the pair of SOP marks will move past the sensors first. Therefore, before generating a SOP signal, the first pair of SOP marks is used to align the print head, to the left and right SOP marks to within one tick mark width. This alignment is accomplished by noting the number of tick marks one member of the pair of SOP marks lags the other member, and activating a servo-mechanism to correct the lag on one side of the print medium. The second pair of SOP marks, each member of the second pair of SOP marks now aligned to within one tick mark, is used to trigger the start of plot signal. Either member of the pair may be selected to trigger the SOP signal.

Sine wave 224 in FIG. 12 of patent '542 shows the relative signal strength from a sensor as the SOP marks on the print medium or "substrate," as the print medium is sometimes called, moves past the sensor. The location of the zero crossing 260 of the sine wave 224 can vary to the left or right depending upon the contrast between the dark mark and the light substrate upon which the dark mark is placed Since the SOP signal produces a zero crossing 260 at which time the printing of the data begins, and since the location of the zero crossing 260 can vary by the pitch of the tick marks (i.e. by the distance between adjacent tick marks), an ambiguity in the location of the tick mark can result in a one tick mark ambiguity in the beginning of the plot. Since one tick mark is equivalent to four lines of print (the electrostatic pint head can print a line every 0.0025 inches and the spacing between center lines of tick marks is 0.010 inches) the resulting uncertainty in the start of the plot will be four lines. This is totally unacceptable for high precision printing of the type required when overlays are being prepared such as in the semiconductor industry for integrated circuit plots.

SUMMARY OF THE INVENTION

In accordance with this invention, a start of plot ("SOP") mark is formed in a specific configuration on the print medium so that with the appropriate circuitry, the ambiguity in the SOP signal generated using a prior art SOP mark and circuit of the type disclosed in the '542 patent is avoided. In accordance with this invention, a three component start of plot mark is used on the print medium (i.e., the substrate on which information is to be printed) together with a separate track of tick marks. A first component or portion of the start of plot mark is on one side of a reference line, a second component or portion of the mark is on the second side of the reference line and a third component or portion of the mark is again on the first side of the reference line. The areas of each of the three portions of the mark are substantially equal. The three-part mark then passes over two sensors as the substrate moves past the sensors.

The two sensors are so arranged that the edges of the tracking line are positioned over the centers of response of the two sensors. Thus, both sensors are positioned to sense equal portions of the tracking line and the blank medium if there was no displacement of the sensors relative to the tracking line. Under the ideal situation, their output signals would be in balance. Any lateral displacement of the tracking line would cause their output signals to become imbalanced which would activate a servo mechanism to position the print head to realign with the tracking line. When the three-portion SOP mark passes over the two sensors, the first portion of the mark covers one sensor with a completely dark image while the other sensor is covered with the blank print medium. This causes a major imbalance in their output signals requiring the servo-mechanism to be disabled. The second portion of the SOP mark then covers the first sensor with the blank print medium, and the second sensor with a completely dark image. This also causes an imbalance in their output signals but in an opposite manner. The third portion of the SOP mark creates the same condition as the first portion.

A signal is formed by taking the difference between the output currents of the two sensors. This current signal is converted to a voltage signal. When the tracking line is present, this voltage signal contains positional information of the line and when the SOP mark is present, contains information as to the position of the start of the plot.

The peak of the signal generated by the first portion of the mark passing the sensors and the peak of the signal generated by the second portion of the mark passing the sensors are detected and their values stored. These two peak signals are then summed to provide a reference signal or "threshold." The reference signal is compared to the signal generated by summing the signals from the first and second sensors, as the sensors begin to sense the third portion of the mark while the second part of the mark is leaving the sensors. When the signal (called the "sum signal") resulting from summing the output signals from the first and second sensors as the third portion of the mark on the substrate moves past the sensors equals the reference signal, a start of plot (i.e. SOP) signal is generated to initiate the plot. This SOP signal is generated in response to the "zero" crossing of the sum signal which indicates that the desired position to begin plotting has been detected. Note that the word "zero crossing" is not totally accurate, although it conveys the general function of this portion of the circuit. Rather, the comparison of the reference signal or threshold with the actual level of the sum signal during the transition of the print medium from the second part of the mark to the third portion of the mark above the sensors results in a start of plot signal being generated when the level of the sum signal equals the threshold. The threshold was generated by summing the positive and negative peaks of the signals produced by the first and second sensors in response to the first two portions of the mark passing these sensors.

In the prior art, the SOP signal could vary relative to the tick marks by as much as four print lines, due to the deviation in the contrast between the ink and the background of the print medium, due to the reflectivity and illumination level of the print medium, due to the variation in individual sensor characteristics and also due to the variation in the locations of the sensors and the sensor assembly, which result from the uncertainties associated with the assembly of these sensors. In sharp contrast to this prior art, the current system provides self-compensation. Rather than relying on a zero crossing relative to an absolute reference zero, the present system provides a relative reference level which takes into account deviations in the locations of the sensors sensing the SOP marks, variations in individual sensor characteristics, and variations in the contrast between the SOP mark and the background of the print medium and uses this generated reference level to produce the SOP signal.

An advantage of this invention is that variations in the intensity of the ink used to form the start of plot mark on the substrate relative to the background of the print medium, variations due to reflectivity and illumination level of the print medium, and the variations in the locations and certain characteristics of the sensors are automatically compensated.

This invention will be more fully understood in conjunction with the following detailed description taken together with the attached drawings.

DESCRIPTION OF THE DRAWINGS

FIGS. 2A and 2B show waveforms in a two-portion SOP mark illustrating the effects of imbalance in sensor sensitivities, variation in illustration level or variation of reflectives in the print medium.

FIG. 2C(i) shows a prior art two-portion SOP mark.

FIG. 2C(ii) shows a two-portion SOP mark extending above and below the reference line in accordance with this invention.

DETAILED DESCRIPTION

Figure 5A:
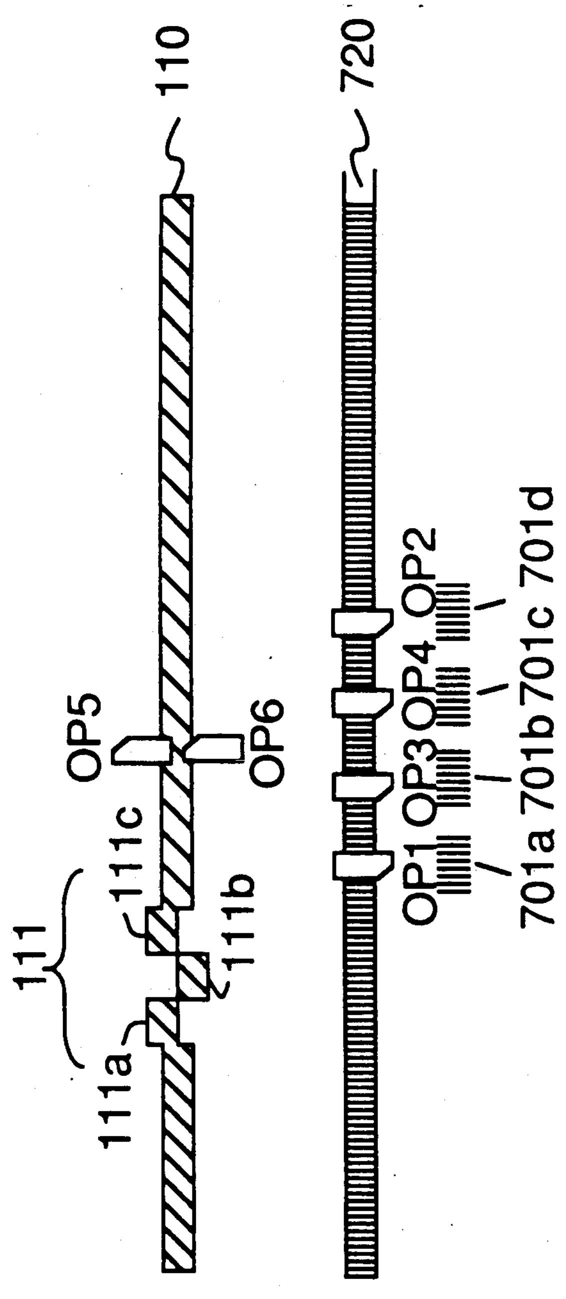
FIGS. 5A and 5B show the placement of sensors OP1 through OP6 relative to the start of plot mark 111, the tick marks 720 and the quadrature gratings 701*a*, 701*b*, 701*c* and 701*d*.
Figure 5B:
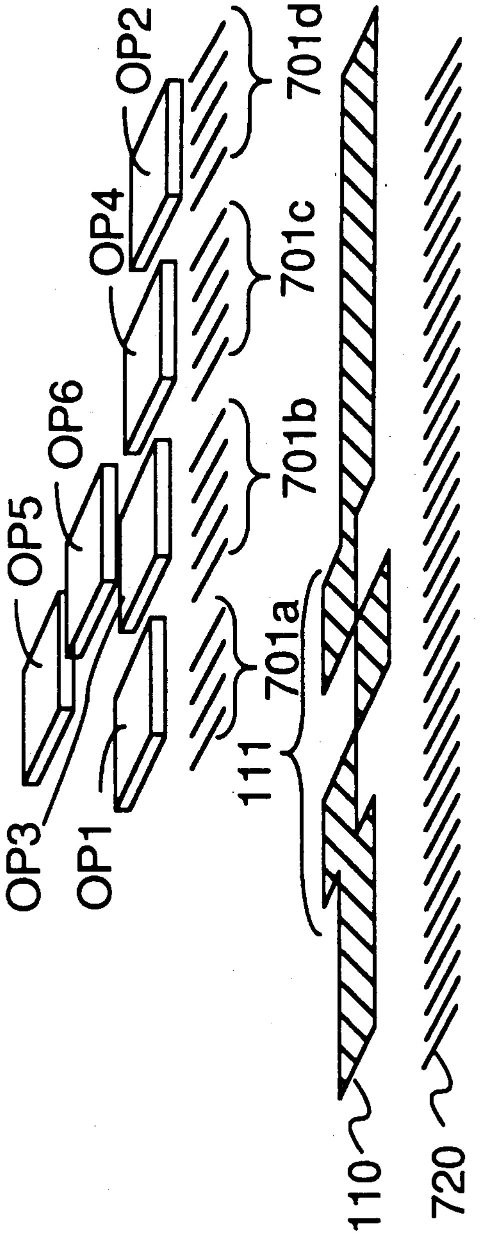

To understand this invention, the location of the light sensors OP1 through OP6 (FIGS. 1A, 1B, 1C, 1D, 5 and 6A) relative to the "tick marks" 720 (FIGS. 5 and 7A) and SOP mark 111 (FIGS. 1A, 5 and 7A) is important. As shown in FIGS. 7A to 7C, the sensors for sensing the "tick marks" 720 and the SOP mark 111 on the print medium are housed in the same sensor assembly 700. The construction and assembly of one such sensor assembly is described in copending application entitled "A Sensor Assembly for Sensing Printed Marks on a Print Medium" by Dale C. Freese, Ser. No. 07/455,642 filed on the same day as this application and assigned to Synergy Computer Graphics Corporation, which is also an assignee of this application; is hereby incorporated by reference in its entirety.

FIG. 7A is a plan schematic view of sensor assembly 700 with its location relative the print medium 128 indicated. Print medium 128 moves in the direction of arrow 129 relative to sensor assembly 700 such that SOP mark 111 passes beneath sensors OP5 and OP6 while tick marks 720 pass in series beneath sensors OP1, OP3, OP4 and OP2.

Figure 1A:
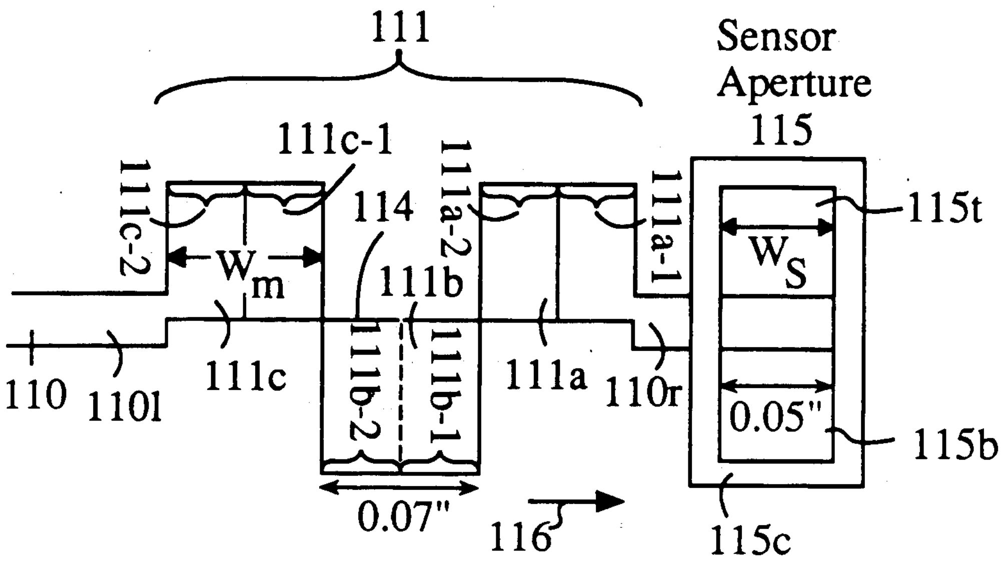
FIG. 1A illustrates the start of plot mark 111 placed in a separate track on the paper or print medium on which the image is to be printed.

FIG. 7B is an isometric view of the same sensor assembly 700 showing the relative location of light sensors OP1 through OP6 to quadrature gratings 701*a* through 701*d* and regions 115*t*, 115*b* of aperture 115 (FIG. 1A). FIG. 7C shows the placement of the sensor assembly 700 with respect to the moving medium 128 and the tick marks 720 and start of plot mark 111 on medium 128. Note that sensor assembly 700 is placed above the print medium 128 such that sensors OP1, OP3, OP4 and OP2 are directly adjacent tick marks 720 so as to be able to sense light reflected from these marks while sensors OP5 and OP6 are directly adjacent SOP mark 111 so as to be able to sense light reflected from the two or three portions of mark 111 in a manner to be described.

Sensor assembly 700 is secured to the frame (not shown) of the electrostatic printer by screws through two sets 702 and 702' of three threaded holes each; one set on each side of the sensor assembly 700. Of course, any other suitable fasteners can be used to secure sensor assembly 700 to the frame. The top of sensor assembly 700 is glass coated with opaque conductive material, except for a partially transparent rectangular strip 701 in the middle of the glass parallel to the tick marks 720 on print medium 128 so as to be capable of being located below these tick marks 720. A small transparent window 115 adjacent the rectangular strip 701 corresponds to regions 115*t* and 115*b* of aperture 115 shown in FIG. 1A. On the middle rectangular strip 701 are formed (typically but not necessarily by engraving) four sets of Ronchi gratings, 701*a*, 701*b*, 701*c* and 701*d* in quadrature relationship to each other. A Ronchi grating is a set of lines or rulings formed in or on the glass surface, consisting of successive rectangular strips of opaque areas separated by transparent space. Within each set of gratings 701*a* to 701*d* in one embodiment used with this invention, the distance between an edge of a line in a set of lines or rulings and the corresponding edge in the next line in the set is 0.01", and the width of each ruling is 0.005". Since a print line in this embodiment begins every 0.0025", there are four print lines on the print medium between the corresponding edges of each pair of directly adjacent lines in a set of lines or rulings in the Ronchi grating. The configuration of the Ronchi grating approximates the tick marks Since the print dot size of the preferred embodiment is approximately 0.005", by printing the dark portion of the tick mark to be one dot wide, each dark portion of the tick mark is 0.005" wide. Since a print line may begin every 0.0025", by printing a small portion of every fourth line—commonly referred to as "one-on, three-off", —alternate black marks separated by white spacings, each mark being 0.005" wide and each spacing also being 0.005" wide, constituting the track of tick marks are obtained on the print medium. In this embodiment, print lines are printed at any one of 12.5 Hz, 25 Hz and 50 Hz at the option of the user.

As will be described hereinbelow, the Ronchi gratings 701*a*, 701*b*, 701*c* and 701*d* (FIGS. 5A, 5B, 7A and 7B) are used to generate the "quadrature" signals which in turn initiate each print line.

To start a plot at the correct print line, the SOP signal 130 (FIG. 1C and also FIGS. 4A to 4I) and the quadrature signals (FIGS. 8A and 8B) are separately generated and are respectively used to start plotting on the print medium 128 and to start each line of the plot once the start of plot ("SOP") signal is generated. The generation of the SOP signal 130 (FIG. 1C) is described first.

Figure 1B:
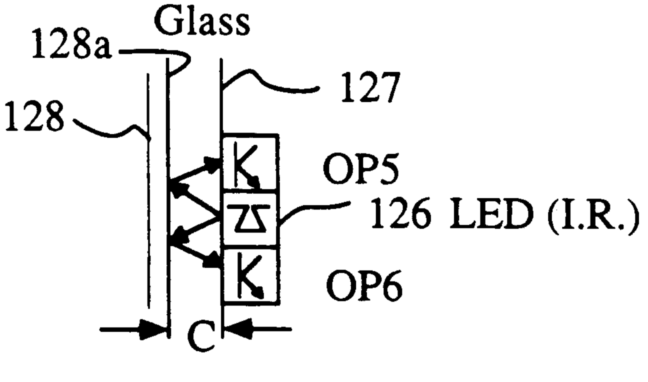
FIG. 1B illustrates the relative locations of the two sensors OP5 and OP6 used to detect the presence of the start of plot mark 111 shown in FIG. 1A.
Figure 1C:
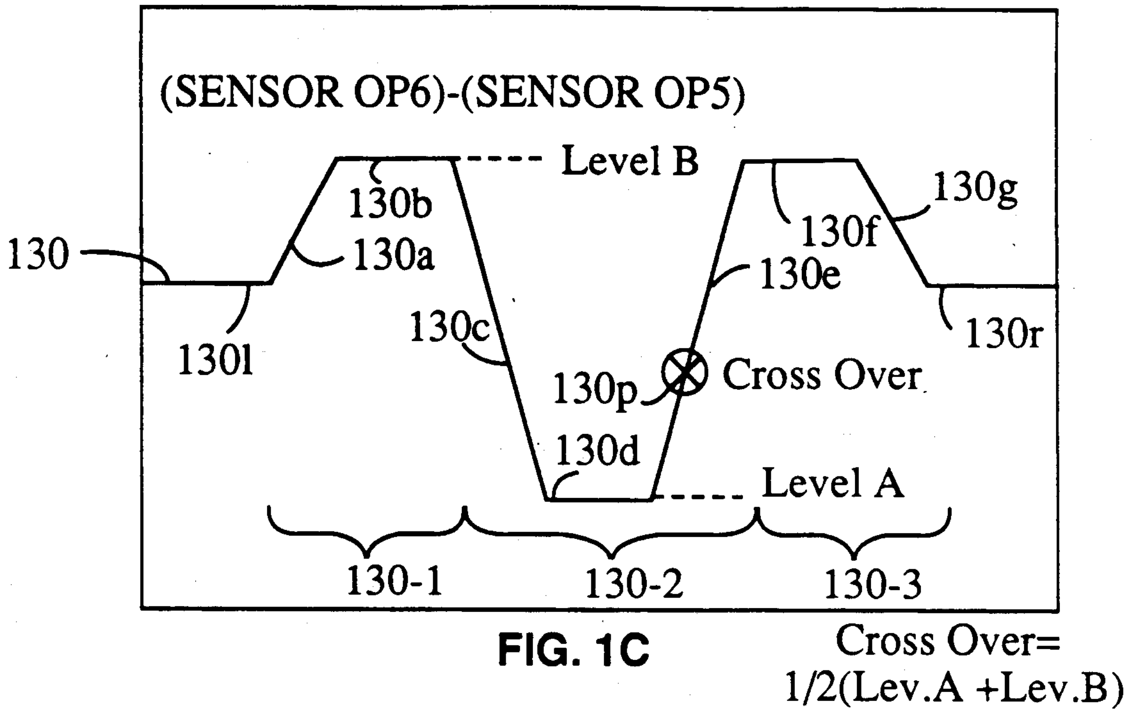
FIG. 1C illustrates the waveform 130 produced by the passage of the start of plot mark 111 past the regions 115*t*, 115*b* in aperture 115 containing the sensors OP5 and OP6 shown in FIG. 1B.

FIGS. 1A and 1B show the start of plot mark 111 on the print medium 128 relative to aperture 115 in the sensor assembly 700 (FIGS. 7A, 7B and 7C) containing light sensors OP1 through OP6. Sensor assembly 700 is attached to the frame of the electrostatic printer such that when the start of plot mark 111 on the print medium 128 moves relative to the aperture 115 the light sensors OP5 and OP6 (shown in FIG. 1B) are able to detect through regions 115*t* and 115*b*, respectively, in aperture 115 a change in the light reflected from the print medium 128 due to the passage of the start of plot mark 111. FIG. 1C illustrates the waveform 130 so produced by the passage past aperture 115 of the start of plot mark 111 shown in FIG. 1A.

As shown in FIG. 1A, the start of plot mark 111 in this embodiment consists of a continuous band of color 110*l*, 110*r*, which contrasts with the color of the print medium 128. At the appropriate position where plotting is to be started, three parts or portions 111*a*, 111*b*, 111*c* of mark 111 are formed of a color which contrasts with the color of the print medium 128. When the print medium 128 is white or a light color, the bands 110*l*, 110*r* and portions 111*a*, 111*b* and 111*c* are of a dark color such as black. Thus, portions 111*a* and 111*c* extend vertically above reference line 114 to form rectangular sections of dark color in contrast to the lighter color of the print medium 128 while portion 111*b* extends below line 114 to form a similar rectangular portion of dark color in contrast to the lighter color of the print medium 128.

As shown in FIG. 1B, an LED 126 which produces a selected light signal such as an infrared signal, is positioned so as to transmit infrared radiation to that portion of the surface 128*a* of the print medium 128 which faces sensors OP5 and OP6 and which includes control track 110. Typically, the print medium 128 containing control track 110 is maintained a distance C from LED 126 such that radiation from LED 126 will not only strike the surface 128*a* of the print medium directly above LED 126 but will also strike the control track 110 and the start of plot mark 111 formed thereon at various locations. LED 126 and the two light sensors OP5 (the top sensor which senses light reflected from portions 111*a* and 111*c* of SOP mark 111) and OP6 (the bottom sensor which senses light reflected from portion 111*b* of SOP mark 111) are located adjacent aperture 115 in sensor assembly 700 (shown in FIGS. 1A, 7A, 7B and 7C). Sensor OP5 is located adjacent area 115*t* (FIG. 1A) of aperture 115 and sensor OP6 is located adjacent area 115*b* of aperture 115. LED 126 (FIGS. 1B and 7E) is located in that portion of aperture 115 intended to be adjacent dark band 110. Thus as the print medium 128 moves past aperture 115 (the direction of motion of medium 128 is indicated by arrow 116 pointing to the left in FIG. 1A) the sensors OP5 and OP6 sense the light (more accurately, the radiation) from LED 126 reflected off print medium 128.

A difference signal 130, as shown in FIG. 1C, illustrates the relative change in light intensity received at the sensors OP5 and OP6. This difference signal 130 is the output signal of sensor OP6 minus the output signal of sensor OP5. The level 130*l* of signal 130 normally has a zero value if dark band 110 on the print medium 128 is aligned symmetrically with respect to sensors OP5 and OP6. Portions 130*l* or 130*r* of waveform 130 will be zero when the sensor is properly aligned with control track 110. If there is misalignment, the signal 130*l* will be non-zero and is used to operate a servo-mechanism to position the printhead (and thus the sensors) to align it with control track 110 and thus maintain a zero level for signal 130*l*. In this embodiment, two control tracks 110 are used, one on each of the left and right edges of the print medium 128. If the print medium 128 is laterally displaced, the signal 130*l* on the left and its counterpart 130*l* signal on the right will be offset from zero in the same direction by the same amount, and the servo-mechanism will operate to position the printhead alignment with the control tracks. However, if there is an expansion or contraction of the print medium 128, the offset from zero in signals 130*l* on the left and on the right will be in opposite directions, and the servo-mechanism will not be activated in this case.

As dark portion 111*a* of the SOP mark 111 passes sensor OP5, the dark color of portion 111*a* reduces the amount of light reflected off the print medium 128 and sensed by sensor OP5. Accordingly, the difference signal 130 (FIG. 1C) rises from the value represented by portion 130*l* of waveform 130 to a positive value (level B) corresponding to portion 130*b* of waveform 130. This rise results from sensor OP6 producing a strong output signal while the output signal of sensor OP5 drops linearly (as shown by the positive slope of portion 130*a* of curve 130) in response to the linear replacement of the light background of the print medium 128 by the dark material of portion 111*a* of SOP mark 111. As the print medium 128 moves right in the direction of arrow 116 relative to aperture 115, dark portion 111*a* of SOP mark 111 gradually passes by region 115*t* in aperture 115 and thus the output signal from sensor OP5 begins to increase, so that the difference (OP6–OP5) decreases at a negative slope depicted by portion 130*c* of curve 130. The length of flat portion 130*b* of curve 130 represents the excess of the width $W_m$ of dark portion 111*a* of SOP mark 111 over the width $W_s$ of portion 115*t* in aperture 115. Of course, if width $W_m$ of portion 111*a* of SOP mark 111 is less than width $W_s$ of region 115*t* in aperture 115, then portion 130*b* of waveform 130 will still have a finite length, but the difference in amplitude between portion 130*l* and portion 130*b* of waveform 130 will be less because some light will be reflected from the lighter portions of print medium 128 and pass through region 115*t* in aperture 115 to sensor OP5. When width $W_m$ of section 111*a* is identical to width $W_s$ of region 115*t* in aperture 115 then, and only then, will flat portion 130*b* be eliminated. In this embodiment $W_s$ is 0.05", and $W_m$ is 0.07".

As the left edge of dark portion 111*a* of SOP mark 111 (FIG. 1A) begins to pass region 115*t* of aperture 115, the right edge of dark portion 111*b* of SOP mark 111 begins to pass by sensor OP6 behind region 115*b* of aperture 115 (FIG. 1B). Thus the difference signal 130 decreases at twice the rate as it increased when dark portion 111*a* of SOP mark 111 passed region 115*t* in aperture 115 and sensor OP5. For this reason, the slope of portion 130*c* of curve 130 in FIG. 1*c* is shown to be twice as steep as the slope of portion 130*a* of curve 130. When dark portion 111*a* of SOP mark 111 is completely past region 115*t* in aperture 115 and dark portion 111*b* of SOP mark 111 is directly adjacent region 115*b* in aperture 115, the difference signal 130 reaches level A as depicted by portion 130*d* of curve 130. Should the contrast between dark portions 111*a*, 111*b* and 111*c* of the SOP mark 111 and the background color of the print medium 128 vary, the sensitivities or relative locations to the tracking line 110 of the sensors vary, or the light impinging on dark portions 111*a* and 111*c* of the SOP mark 111 vary from the light impinging on portion 111*b* of SOP mark 111, then the absolute values of levels A and B will differ.

As the print medium 128 continues to move past aperture 115 in the direction of arrow 116, sensor OP5 begins to detect the presence of portion 111*c* of SOP mark 111. Meanwhile, portion 111*b* of SOP mark 111 begins to pass beyond region 115*b* of aperture 115 thus gradually allowing more light to be reflected from the print medium 128 onto sensor OP6 Accordingly, the difference signal 130 begins to increase in value at the rate depicted by portion 130*e* of curve 130 (FIG. 1C). The slope of portion 130*e* is positive but has the same absolute value as the slope of portion 130*c* of curve 130. When all of dark portion 111*b* of SOP mark 111 has passed beyond region 115*b* in aperture 115 and dark portion 111*c* is directly adjacent region 115*t* in aperture 115, the difference signal 130 (FIG. 1*c*) again reaches a positive value depicted by portion 130*f* of curve 130. As dark portion 111*c* begins to pass beyond region 115*t* in aperture 115, the difference signal 130 begins to drop in value as represented by portion 130*g* until the difference signal 130 reaches again the level depicted by portion 130*r* of curve 130.

Of importance to this invention, the cross over point 130*p*, in this embodiment, is defined as the point in time at which one half of portion 111*b* of SOP mark 111 and one half of portion 111*c* of SOP mark 111 are adjacent the sensors, which corresponds to the point at which portion 130*e* of signal 130 matches the reference level determined by the peak values A and B in the positive and negative excursions of difference signal 130. Cross over point 130*p* may or may not be zero volts depending upon a number of variables such as the sensitivities and locations of the sensors and the intensities of the coloring of, and the light reflected from, portions 111*a*, 111*b* and 111*c* of SOP mark 111 in contrast with background color of, and the light reflected from, the print medium 128. Therefore, according to the present invention, the absolute location of the cross-over point 130*p* taking into account the uncertainties in the system may be automatically determined by the use of the three portion SOP mark 111. The precise mathematical relationship will be described hereinbelow in conjunction with FIG. 2D.

Figure 1D:
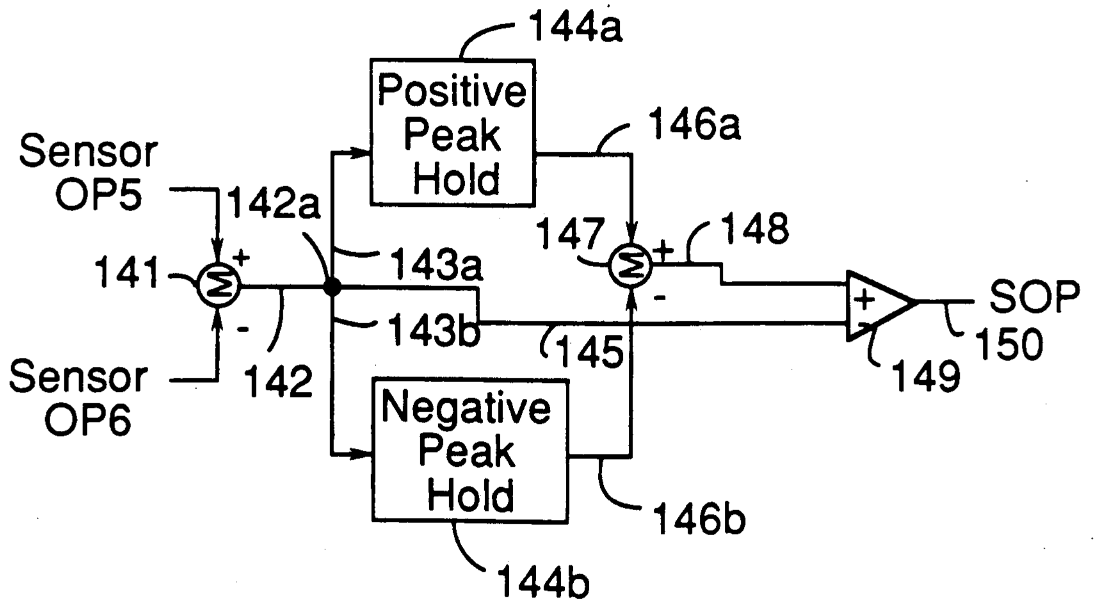
FIG. 1D shows in block diagram form the circuit used to process the signals produced by sensors OP5 and OP6 in FIG. 1B upon passage of the start of plot mark 111 (FIG. 1A) on the substrate or print medium past these sensors OP5 and OP6.
Figure 3:
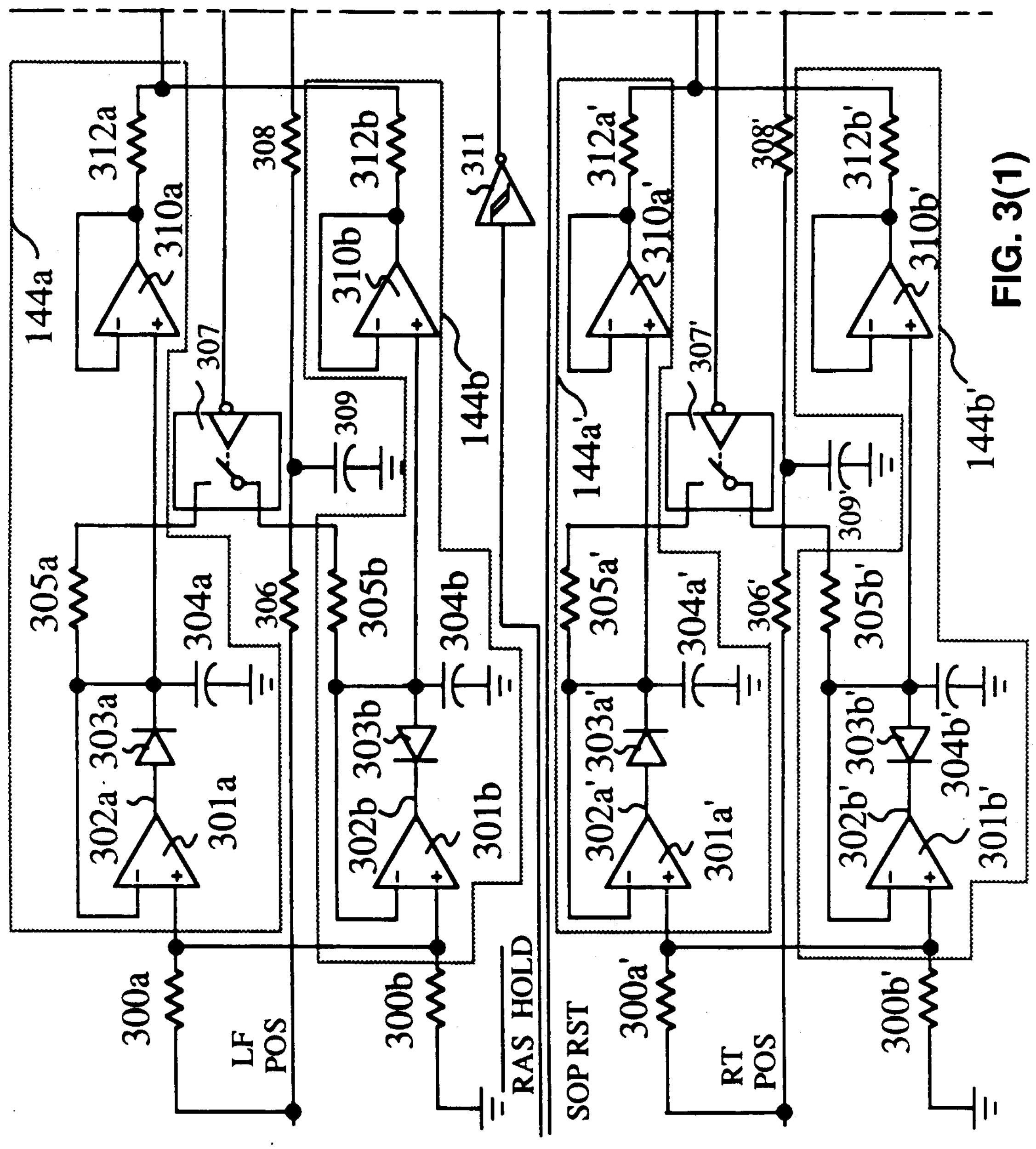
FIG. 3 is the schematic diagram of one embodiment of two replicas of the circuit shown in block diagram form in FIG. 1D, replica 3A processing signals generated by the left SOP marks and replica 3A' processing signals generated by the right SOP mark.
Figure 3:
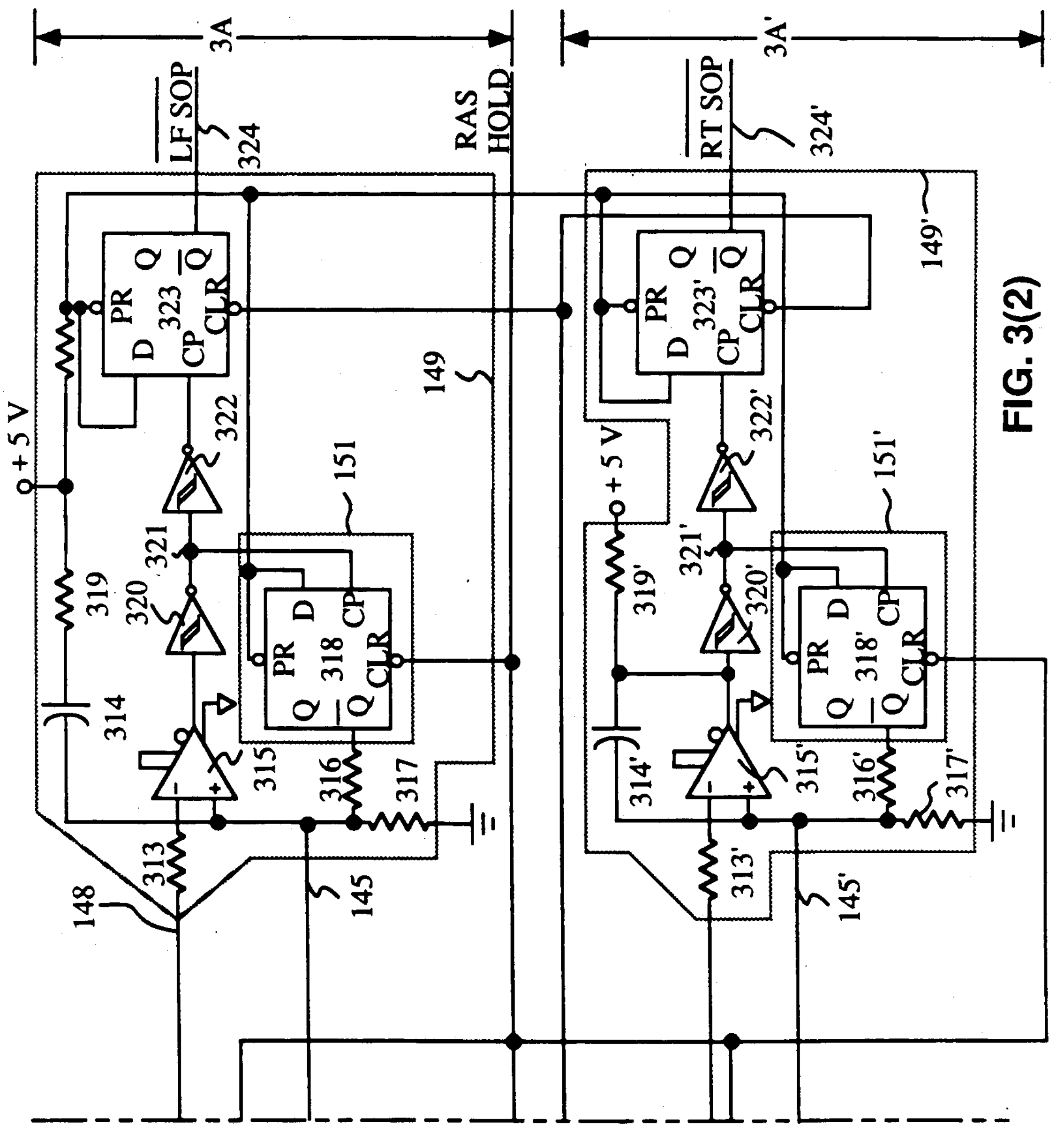

A circuit for implementing this invention is shown in block diagram form in FIG. 1D. The detailed circuit used to implement this invention is shown in FIG. 3 which will be discussed below. Nevertheless, this simplified circuit shown in FIG. 1D illustrates the operation of the SOP mark 111 of this invention to achieve a start of plot signal accurately located relative to the print medium 128 despite uncertainties such as those in the color contrast of the print medium background and the SOP mark 111 and in the variation of sensitivities of sensors OP5 and OP6, and uncertainties in their positions relative to the tracking line 110.

As shown in FIG. 1D, the output signals from sensors OP5 and OP6 are subtracted in summing network 141 to give difference signal 130 discussed above. Difference signal 130 is transmitted on lead 142 to node 142*a* and from there on lead 143*a* to positive peak detecting and hold circuit 144*a* and on lead 143*b* to negative peak detecting and hold circuit 144*b*. Peak detecting and hold circuits of the type used in this invention are well-known and hence only one example will be described later with reference to FIG. 3. The output signals from positive peak detecting and hold circuit 144*a* and from negative peak detecting and hold circuit 144*b* are transmitted on leads 146*a* and 146*b*, respectively, to summing network 147. Network 147 produces on lead 148 a signal proportional to the algebraic sum of the peaks detected at the peak detecting and hold circuits 144*a* and 144*b*. Since the two peaks are of opposite polarities, this signal on lead 148 is proportional to the difference between the absolute values of the peaks. This signal on lead 148 is then transmitted to the positive input lead of comparator network 149. The difference signal on lead 148 represents the reference level, and thus the cross-over point 130*p* (FIG. 1C). At the same time, the output signal (signal 130 shown in FIG. 1C) from difference network 141 is transmitted on lead 145 directly to the negative input lead of comparator circuit 149. Comparator circuit 149 produces an output signal on lead 150 when the reference signal on lead 148 is matched by the output signal 150 from difference network 141 on lead 145. The output signal on lead 150 from circuit 149 is the start of plot or SOP signal which initiates the start of plotting on the print medium 128. Because comparator 149 compares the cross-over point 130*p* represented by the level of the signal on positive input lead 148 to the waveform 130 on lead 145 from difference network 141, the SOP signal is independent of the system variables affecting the strength of the signals from sensors OP5 and OP6 such as the uncertainties in the placement of the regions 115*t* and 115*b* of aperture 115, hence sensors OP5 and OP6, variations in coloration of the SOP mark 111 relative to the background of the print medium 128, and variations in the light detected by, and the characteristics of, sensors OP5 and OP6. In essence, the circuit of FIG. 1D normalizes the SOP signal by generating a variable reference signal which automatically takes into account and thus eliminates these variables.

FIG. 2A shows the impact of uncertainties such as a change in the reflectivity of the print medium 128, an imbalance in sensor sensitivities and characteristics and a change in the coloration of a two-portion prior art SOP mark, on the output signal from the sensors OP5 and OP6. Note that the output signals from the sensors OP5 and OP6 are shown in a triangular form rather than with squared-off tops and bottoms to reflect the differences in widths of the SOP marks relative to the sensor apertures. The triangular waveform corresponds to the case when, referring to FIG. 1A, the widths $W_m$ and $W_s$ are equal. The prior art SOP mark 211, shown in FIG. 2C(i), contrasts sharply in color to the background medium 128. This prior art mark 211 only consists of two portions 211*a* and 211*b*; the portions 211*a* and 211*b* are both the height of control track 210, which is similar to control track 110 of the preferred embodiment of the present invention. Portions 211*a* and 211*b* also have a height Hm which is less than the sensor field Hs. However, this SOP mark 211 is unreliable for triggering the SOP signal because system uncertainties such as a deviation of the sensor position from being perfectly equidistant from the center or reference line, a variation in illumination intensity, a variation in the contrast of the SOP mark 211 with respect to the background, or an imbalance of sensor sensitivity will lead to triggering the SOP signal at the wrong time.

One aspect of the present invention over the prior art is the extension of the SOP mark 211 above and below the tracking line 114 such that the height Hm of the SOP mark portions 211*a* and 211*b* exceeds the height of the sensor field Hs. An embodiment showing this aspect is shown in FIG. 2C(ii). In FIG. 2C(ii), the height of each of portions 211*a*′ and 211*b*′ of SOP mark 211′ is Hm. As will be shown later, as long as (1) Hm is larger than Hs, the height of the aperture 115, and (2) the deviation of the sensor location with respect to the reference line 214 of the control track 210′ is less than the difference between Hm and Hs, detection of SOP mark 211′ is not affected by the deviation. However, even with SOP mark 211′, the problem of inaccurate triggering due to, for example, sensor sensitivity imbalance, changes in contrast between print medium and the SOP mark, or reflectivity of the print medium remains. The signal represented by waveform 201 is the difference signal of the output signals of sensors OP5 and OP6 generated by an SOP mark such as 211′, moving with the print medium 128 in direction indicated by arrow 216.

Accordingly, waveform 202 is generated by a two-portion SOP mark similar to SOP mark 211′ which has a weaker contrast in color between the SOP mark and the background, resulting in a lower amplitude signal than waveform 201. If the two sensors (corresponding to sensors OP5 and OP6 in FIG. 1B) used to detect this mark were exactly matched and located equidistant from the center line 114 of the control track 110 (see FIG. 1A), the zero crossing points 201*p* and 202*p* of the two waveforms 201 and 202, respectively, would be identical. However, if the sensitivities of the two sensors are imbalanced, as the drawing shows, the zero crossing point 202*p* of waveform 202 is shifted to the right of the zero crossing point 201*p* of waveform 201 by an amount related to the imbalance. The SOP mark 211′ contains two portions 211*a*′ and 211*b*′ corresponding respectively to portions 111*a* and 111*b* of SOP mark 111 (FIG. 1A).

Because portion 211*a* of SOP mark 211 is situated more proximal to the sensors OP5 and OP6 than portion 211*b*′ of SOP mark 211, the difference signal waveform 202 (OP5-OP6) rises initially, corresponding to a drop in the strength of the sensor output signal at OP6 as portion 211*a*′ of mark 211 passes OP6, as the print medium travels in the direction indicated by arrow 216. As portion 211*b*′ of mark 211 moves into the field of sensor OP5, decreasing OP5's output signal, the output signal at OP6 increases as portion 211a' of SOP mark 211' leaves the field of sensor OP6, resulting that difference signal 202 (OP5- ) decreasing from a positive value to a negative va If, for any reason, such as variations in coloration the SOP mark portions 211a' and 211b', the difference 202's positive peak value A' is of greater magnitude the difference signal waveform 202's negative peak B', as shown in FIG. 2A, the zero-crossing point 202p of 202 will be displaced to a later time. An imbalance sensitivity provides a similar result. By waveform 201 shows the situation when the output signals of sensors OP5 and OP6 are balanced.

FIG. 2B illustrates the transition of the SOP signal produced by the zero crossing point 201p of the waveform 201. Naturally, if the zero crossing of the waveform 201 shifts in time, then the transition of the SOP signal will shift in time also. The result is a shift of the SOP signal relative to the tick marks on mark track 218. As illustrated in FIG. 2B, the in zero crossing in waveform 202 of FIG. 2A cause shift in triggering of SOP signal by a time period to the print medium travelling a distance of $\frac{3}{4}$ the pitch of a tick mark. The pitch of a tick mark to a group of four print lines, and since the is set to begin plot on the same one of the four print lines a displaced SOP signal missing the print line selected for start of plot will cause the printer to begin four print lines late. In high resolution overlays, for example, elimination of this is important to obtain high quality plots.

In the two portion SOP mark 211' (FIG. 2c (ii)), the zero-crossing point 202p (FIG. 2A) is shown shifted relative to the desired zero-crossing point 201p by in excess of one-half the distance common points on adjacent tick marks. This could caused, for example, by variation in color contrast between the two portions of the SOP mark 211 and the background the print medium, as well as by variation in the relative of sensors OP5 and OP6 to the tracking line 110.

Figure 2D:
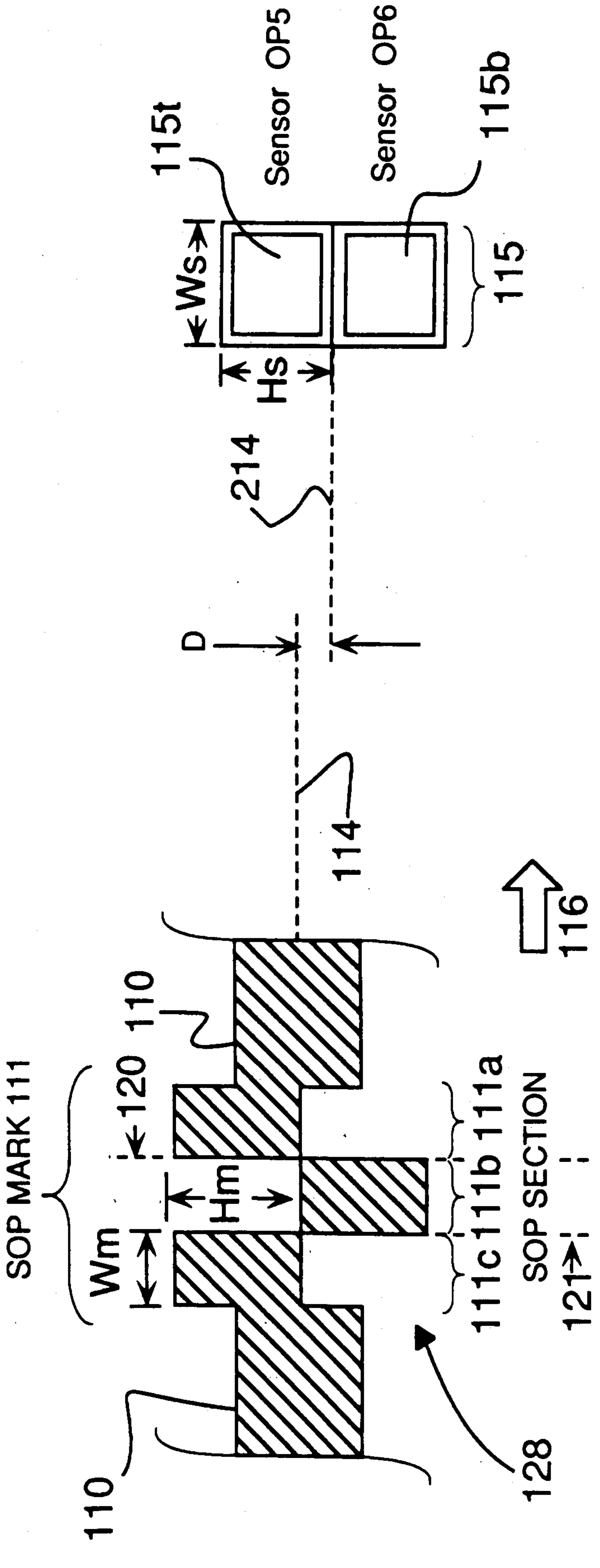
FIG. 2D shows the three portion SOP mark of this invention and sensors OP5 and OP6 for sensing this mark with the reference line 114 of the three portion SOP marks being offset relative to the center line 214 of the sensors OP5 and OP6.

FIG. 2D shows how the three-portion SOP mark 111 (FIG. 1A) of this invention overcomes the above-described problem with the two-portion SOP mark 211 and 211' (FIGS. 2c(i) and 2c(ii)) and always generates the SOP signal at the correct time. In FIG. 2D, the reference line 114 of the three-component SOP mark 111 of this invention (FIG. 1A) is shown offset by a distance D relative to the sensor center line 214 between sensors OP5 and OP6. Hs and $W_s$ denote respectively the height and width of region 115t in aperture 115 perpendicular to the direction 116 (FIG. 1A) in which print medium 128 moves relative to the sensors OP5 and OP6. Hm and $W_m$ similarly denote respectively the height and width of the SOP mark 111, perpendicular to and in the direction 116. Hm is measured from the center line 114 of the SOP mark 111.

Assume that (i) the response of each sensor OP5 and OP6 is uniform across its area;

(ii) the dark portions of the image of the SOP mark 111 and control track 110 are uniform in optical density throughout; and (iii) the illumination of the image of the SOP mark 111 and control track 110 does not change with time as the SOP mark 111 passes sensors OP5 and OP6.

Sensor OP5 inside region 115t of aperture 115 gives output signal strength Raw (volts/area) over the background non-imaged (i.e., white background) medium, and Rab (volts/area) over a dark toned (i.e., black) Similarly, Rbw and Rbb give, respectively, in volt the output signal strength of sensor OP6 inside region 115b in aperture 115 over non-imaged (i.e., white background) medium and over a dark toned (i.e., black) image.

Accordingly, if $Hm-Hs>D>0$ (i.e, in FIG. 2D, the displacement of the SOP reference line 114 with respect to the sensor center line 214 is as shown in FIG. 2D, and this displacement is less than the difference between Hm and Hs), then the signal output strength OA at sensor OP5, at the instant when portion 111a of the SOP mark becomes directly adjacent (i.e., above) region 115t in aperture 115 as the print medium moves in direction 116, is given by the sum of responses to the mark and to the background now exposed to OP5 due to the misalignment, $$OA=(Ws)(D)(Raw)+(Ws)(Hs-D)(Rab)$$

reflecting that a portion (area $DW_s$) of background medium is exposed to sensor OP5 occupying an area which would others wise be filled completely by mark portion 111a. At the same time, signal strength OB at sensor OP6 is given at this time by $$OB=(Ws)(Hs)(Rbw),$$

reflecting that a non-imaged (i.e. white or background) portion, having area $W_s$ Hs, of print medium 128 completely fills the field of sensor OP6.

The difference signal POS (previously designated 130, described in conjunction with FIG. 1A-C), equal to (OB−OA), is therefore given by $$POS=(Ws)[(D)(Rab)-(D)(Raw)+(Hs)(Rbw)-(Hs)(Rab)] \quad (A1)$$

This represents the positive peak of signal POS under a positive displacement of SOP mark 111 relative to sensor location.

On the other hand, if the SOP center line 114 is displaced in the other direction to the other side of the sensor center line 214, and this negative displacement D is, in magnitude, less than the difference between Hs and Hm (i.e. $O>D>Hs-Hm$), then the output signal of sensor OP5 is given by $$OA=(Ws)(Hs)(Rab)$$

since portion 111a of the SOP mark completely fills region 115t in aperture 115. Correspondingly, at the same time, the output signal of sensor OP6 is given by $$OB=(Ws)(Hs+D)(Rbw)-(Ws)(D)(Rbb)$$

representing that one part of the SOP mark, having area −WsD, is exposed to OP6 (remember that D is a negative value in this instance). In this case the difference signal POS for portion 111a of SOP mark 111 being adjacent region 115t in aperture 115 is given by $$POS=(Ws)[(D)(Rbw)-(D)(Rbb)+(Hs)(Rbw)-(Hs)(Rab)](A2)$$

The same type of analysis is applied when the portion 111b of the SOP mark 111 is directly adjacent to the region 115b in aperture 115.

Again, in the case of a positive displacement D within the range $Hm-Hs>D>O$ $$OA=(Ws)(Hs-D)(Raw)+(Ws)(D)(Rab) \text{ and}$$

$$OB=(Ws)(Hs)(Rbb)$$

representing that while a part of portion 111*b* of SOP mark 111, having an area WsD, is exposed to OP5, the rest of region 115*t* in aperture 115 is occupied by background of the 13 print medium 128. Portion 111*b* of SOP mark 111 completely fills region 115*b* in aperture 115, hence the difference signal POS is given by $$POS=(Ws)[(D)(Raw)-(D)(Rab)+(Hs)(Rbb)-(Hs)(Raw)] \quad \text{(B1)}$$

This represents the negative peak of the difference signal under positive displacement D when portion 111*b* of SOP mark 111 is directly adjacent to the region 115*b* in aperture 115.

For the case of a negative displacement D within the range O>D>Hs−Hm, then, $$OA=(Ws)(Hs)(Raw)$$

$$OB=(Ws)(Hs+D)(Rbb)-(Ws)(D)(Rbw)$$

In this case, an area of size WsD of the print medium is exposed to sensor OP6 and portion 111*b* of SOP mark 111 occupies the rest of region 115*b* in aperture 115, over an area of (*Ws*)(Hs+D).

Hence, the difference signal POS is given in this case by $$POS=(Ws)[(D)(Rbb)-(D)(Rbw)+(Hs)(Rbb)-(Hs)(Raw)] \quad \text{(B2)}$$

This represents the negative peak of the difference signal under negative displacement D.

Notice that at the instant when the position 120 of SOP mark 111, indicated by the dotted line in FIG. 2D, is at the center of the fields of sensors OP5 and OP6, in the case Hm−Hs>D>0, the difference signal POS is given by $$\begin{aligned} POS &= \tfrac{1}{2}(Ws)\,[(D)(Rab) - (D)(Raw) + (Hs)(Rbw) - (Hs)(Rab)] + \tfrac{1}{2}(Ws)\,[(D)(Raw) - (D)(Rab) + (Hs)(Rbb) - (Hs)(Raw)] \\ &= \tfrac{1}{2}(Ws)(Hs)(Rbb - Rab + Rbw - Raw) \end{aligned} \quad \text{(E1)}$$

and similarly for the case 0>D>Hs−Hm $$POS=\tfrac{1}{2}(Ws)(Hs)(Rbb-Rab+Rbw-Raw) \quad \text{(E2)}$$

Results E1 and E2 are obtained because when position 120 of SOP mark 111 is at the center of the fields of sensors OP5 and OP6, the situation is equivalent to each sensor being exposed on the right side to the situation corresponding to when portion 111*a* is adjacent the sensors and on the left side, to the situation corresponding to portion 111*b* is adjacent to the sensors. At this position, the difference signal POS is independent of the displacement D, and is equal to zero if the sensor responses to reflectivities and illumination levels of the image and the background are balanced Hence, it is seen that the extended two-portion mark 211' of FIG. 2C(ii) triggering at zero-crossing will overcome the problem of sensor location deviation from the reference line 114 in the prior art, but is insufficient to provide a remedy to the problems of varying illumination levels or reflectivities in the print medium, or imbalance of sensitivities in the sensors.

In the embodiment of the present invention discussed, portion 111*c* (FIG. 1A) of SOP mark 111 is designed to be identical to portion 111*a*. Thus the results (A1) and (A2) obtained above for the situation when 111*a* is directly adjacent to region 115*t* in aperture 115, with positive and negative displacements D, respectively, are also given identically in the situation when 111*c* is directly adjacent region 115*t* in aperture 115 with similar displacement D. In practice, as will be shown below, only the first half 111*c-l* of portion 111*c* of SOP mark 111 adjacent portion 111*b* of SOP mark 111, need be present.

As discussed in conjunction with FIG. 1A, the difference signal 130 (POS) is at a positive peak value B when portion 111*a* is directly adjacent region 115*t* in aperture 115, and the difference signal 130 (POS) is at its negative peak value A when portion 111*b* is directly adjacent to region 115*b* in aperture 115.

Therefore, according to the present invention, as in the embodiment illustrated by FIG. 3, the reference signal is defined as half the sum of the positive and negative peak values: hence, For Hm−Hs>D>0, using equations (A1) and (B1), $$\begin{aligned} V_{ref} &= \tfrac{1}{2}(Ws)\,[(D)(Rab) - (D)(Raw) + (Hs)(Rbw) - (Hs)(Rab) + (D)(Raw) - (D)(Rab) + (Hs)(Rbb) - (Hs)(Raw)] \\ &= \tfrac{1}{2}(Ws)(Hs)(Rbb - Rab + Rbw - Raw) \end{aligned} \quad \text{(C1)}$$

and similarly for 0>D>Hs−Hm, using equations (A2) and (B2)

$$\begin{aligned} V_{ref} &= \tfrac{1}{2}(Ws)\,[(D)(Rbw) - (D)(Rbb) + (Hs)(Rbw) - (Hs)(Rab) + (D)(Rbb) - (D)(Rbw) + (Hs)(Rbb) - (Hs)(Raw)] \\ &= \tfrac{1}{2}(Ws)(Hs)(Rbb - Rab + Rbw - Raw) \end{aligned} \quad \text{(C2)}$$

It is therefore evident from equations (C1) and (C2) that the reference voltage $V_{ref}$ is the same for a displacement of SOP mark 111 from center line 214 in either direction (FIG. 2D) D, and hence independent of the displacement D. Moreover, if the sensor responses are matched, i.e. if both sensors respond identically, with respect both to image (dark) or background (light), (Raw=Rbw and Rab=Rbb), the reference voltage $V_{ref}$ will be zero.

Consider now at the point when the second half 111*b-2* of portion 111*b*, and the first half 111*c-l* of portion 111*c*, of the SOP mark 111, are directly adjacent to aperture 115 (i.e. position 121 in FIG. 2D is at the center of regions 115*t* and 115*b* of aperture 115); the output signal of sensor OP5 is given by, for a positive displacement D within the limits Hm−Hs>D>0

$$\begin{aligned} OA &= [(Ws)(Hs - D)(Raw) + Ws(D)(Rab)] + \tfrac{1}{2}[(Ws)(D)(Raw) + (Ws)(Hs - D)(Rab)] \\ &= \tfrac{1}{2}(Ws)(Hs)(Raw + Rab) \end{aligned}$$

reflecting the combined partial contributions from the 111*b* and 111*c* portions of SOP mark 111.

Correspondingly, $$OB=\tfrac{1}{2}[(Ws)(Hs)(Rbb+Rbw)]$$

so that the difference signal POS is given by, $$POS=OB-OA=\tfrac{1}{2}[(Ws)(Hs)(Rbb-Rab+Rbw-Raw)] \quad (D1)$$

and similarly for negative displacement D within the limits $0>D>Hs-Hm$ $$OA = \tfrac{1}{2}(Ws)(Hs)(Rab + Raw)$$
$$OB = \tfrac{1}{2}[(Ws)(Hs + D)(Rbb) - (Ws)(D)(Rbw)]$$
$$= \tfrac{1}{2}[(Ws)(Hs + D)(Rbw) - (Ws)(D)(Rbb)]$$
$$= \tfrac{1}{2}(Ws)(Hs)(Rbb + Rbw)$$

so that the difference signal POS is given by $$POS=\tfrac{1}{2}(Ws)(Hs)(Rbb-Rab+Rbw-Raw) \quad (D2)$$

Therefore, the POS signal attains a value equal to the $V_{ref}$(see (C1), (D1)) at this instant, when half of portion 111*b* and half of portion 111*c* of the SOP mark 111 are adjacent to the respective sensors, even if displaced D in either direction. Hence, by defining the reference voltage $V_{ref}$as described previously in conjunction with equations C1 and C2, and triggering the SOP signal when the difference signal POS is matched to this reference level $V_{ref}$, the SOP signal will always be triggered at the instant when equal parts of the second portion 111*b* and the third portion 111*c* of SOP mark 111 are adjacent aperture 115, regardless of the displacement D and regardless of the relative sensitivities of the sensors OP5 and OP6. The object of providing a reliable SOP signal despite deviations in sensor location, or sensor signal imbalance is therefore achieved.

A preferred embodiment of the present invention is now discussed with reference to FIGS. 3, 6A and 6B.

In this preferred embodiment, two tracking lines 110 (FIG. 1A) are used, one on each side of the print medium 128. Each tracking line 110 is also adjacent to a continuous band of tick marks 720 (FIG. 5A) as previously described. The tracking lines 110 are printed by a black print head upstream from the sensors OP1–OP6 (FIG. 5A) as the print medium 128 moves towards the sensors. The black print head prints simultaneously as part of the tracking lines 110 a pair of SOP marks 111 (FIGS. 1A and 2D) one on the left and one on the right of the print medium 128. Before a plot begins, the first pair of the SOP marks are used in conjunction with a servo-mechanism to align the print medium 128 to within one tick mark. The servo-mechanism corrects the angle of the print head based on the time difference in detecting the first pair of left and right SOP marks 111. The next pair of SOP marks 111 is used for triggering the start of plot. In practice, only one of the SOP marks 111 in this second pair is used for the triggering.

Sensor assembly 700 (FIGS. 7A, 7B and 7C) houses both the quadrature sensors OP1, OP2, OP3, OP4 and the SOP mark sensors OP5 and OP6. The circuitry is implemented on two circuit boards: sensor board A (the circuitry of which is shown in FIG. 6A), and sensor board B (the circuitry of which is shown in FIG. 6B). Because two tracking lines 110 are used, there are two sets of quadrature sensors OP1 to OP4 and two sets of SOP mark sensors OP5, OP6, one set of each type on the left and one set of each type on the right. Each sensor includes an LED which provides the radiation to be reflected from the print medium 128. The image printed on the print medium 128 determines the intensity of reflected radiation at the sensor.

Figure 6A:
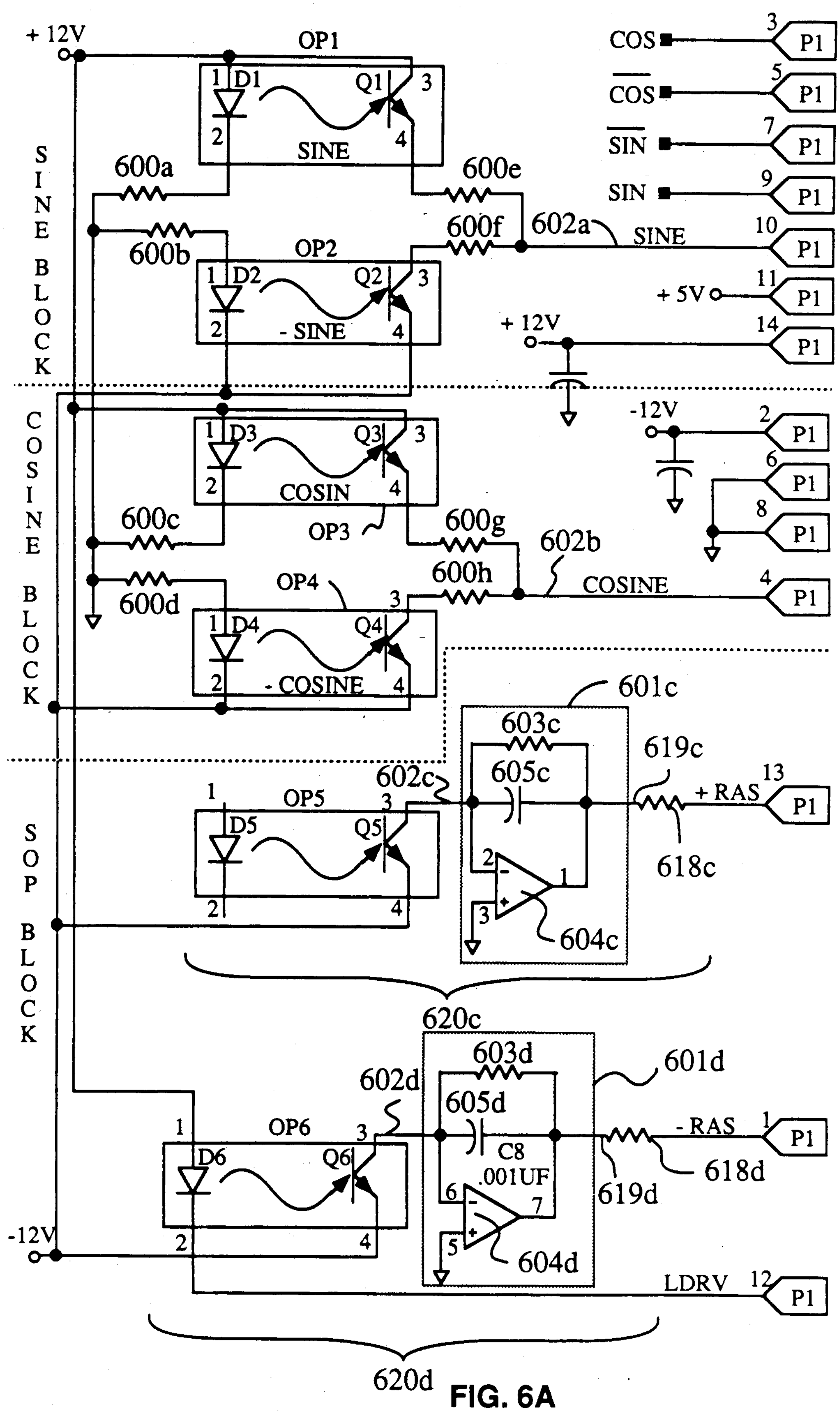
FIGS. 6A and 6B show the schematic circuits of the quadrature sensor circuitry employed with this invention.

The sensor board A can be divided into three functional blocks as shown in FIG. 6A: the sine, cosine and SOP blocks. The sensor board B in FIG. 6B is part of each of the sine and cosine blocks. Because analogous functions are performed by the sine and cosine blocks, they are implemented identically. In each of the blocks are two sensors (OP1 and OP2 in the sine block, OP3 and OP4 in the cosine block, and OP5 and OP6 in the SOP block). Together, in this embodiment, the six sensors (OP1–OP6) constitute all the sensors located in the sensor assembly 700 of FIG. 7A, as described above. Each sensor OP1 to OP6 includes a phototransistor and an associated LED. An example of a sensor of this type is the MTRS9070(LB) infrared LED and Photo-Darlington, manufactured by Marktech Corporation, NY. FIG. 7D shows schematically a package of the MTRS9070(LB), showing LED portion 740, phototransistor portion 741 and leads 742-1 to 742-4 (four leads in total). The surfaces of portions 740 and 741 shown in FIG. 7D are substantially transparent. However, in the SOP block (FIG. 7E), only one LED of the two sensors is actually operative. In FIG. 7E, two sensor packages of the type shown in FIG. 7D are used to implement sensors OP5 and OP6. The packages are placed such that an LED 126 is of one of the packages situated between OP5 and OP6. The sensor assembly is also designed such that the center line of aperture 115 is located directly beneath LED 126. As a result, the radiation of LED 126 through aperture 115 will produce a substantially identical image (intensity and angle of reflection) of tracking line 110 at each phototransistor of sensors OP5 and OP6. Lead LDRV (FIG. 6A) is connected to an external circuitry (not shown) which detects the reflectivity of the print medium 128. The reflectivity of the print medium 128 varies according to the material used to make the print medium 128, e.g. white paper is much more reflective than many plastic films. This external circuit controls the intensities of the emitted light of the operative LED associated with the SOP sensors by varying the current through the terminal LDRV.

The SOP block of the sensor board A shown in FIG. 6A provides two output signals RAS, −RAS using two identical circuits 620*c* and 620*d*. As will be discussed below, the output signals RAS and −RAS are generated by sensors OP5 and OP6 and are used to generate the SOP signal in response to the passage of the SOP mark 111 and to provide positional information in the direction perpendicular to the moving medium.

The circuits 620*c* and 620*d* to provide the RAS and −RAS signals are now described. When the sensor assembly 700 is located on the left (i.e., sensor assembly 700) side of the moving medium, these output signals are named LRAS and −LRAS; these signals are summed to provide the LF POS signal for the SOP generation circuit, to be discussed below in conjunction with FIG. 3. (RRAS and −RRAS will form RT POS identically on the right hand side.)

Referring to FIG. 6A, a current on collector lead 602*d* of phototransistor Q6 modulated by the light reflected from the print medium 128, is generated by phototransistor Q6. The output current on collector lead **602*d* of phototransistor Q6 is filtered through a low-pass filter 601*d*, consisting of resistor 603*d*, capacitor 605*d*, and operational amplifier (op amp) 604*d*, to provide a voltage signal −RAS through resistor 618*d*. Referring to OP6: Pin 1 is connected to +12 volt power supply and to the anode of D6; Pin 2 is connected to the signal LDRV of pin 12 of the sensor board A; Pin 3 is the output lead carrying the output signal on lead 602*d*, which is the input lead to the low-pass filter 601*d*, and Pin 4** is connected to the −12 volt power supply.

The +RAS signal is generated by an almost identical circuit processing the output signal of phototransistor Q5 shown in FIG. 6A. The difference between circuit **620*c* generating +RAS signal and the circuit 620*d*** just described generating −RAS signal is in the difference in connections in sensors OP5 and OP6. The LED D5 in sensor OP5 is left unconnected and inoperative, for the reason to be discussed below in conjunction with FIG. 7E.

Referring to circuit **620*c*, the low-pass filter 601*c* receiving the output signal on lead 602*c* of OP5 (Pin 3) is made up of resistor 603*c* and a capacitor 605*c* connected in parallel across the inverting input lead to and the output lead from op amp 604*c*. The output lead 602*c* of phototransistor Q5 is also connected to the inverting input lead of op amp 604*c*. The non-inverting input lead of op amp 604*c* is grounded. Low-pass filter 601*c* converts the light modulated current signal on lead 602*c* into a voltage on lead 619*c* at the output terminal of op amp 604*c* and eliminates high frequency environmental noise in the signal. In order to achieve a substantially zero voltage output signal when RAS and −RAS are summed to form LF POS or RT POS when the intensities of light incident on sensors OP5 and OP6 are substantially the same, it is necessary to match the characteristics of circuits 601*c* and 601*d*. Hence, the value of resistor 603*c* is set at design time, but the value of resistor 603*d* is chosen at testing time to achieve the matching. This procedure is necessary because the cost of obtaining matching sensors is relatively higher than the cost of adjusting resistor 603*d*** to match overall response.

The output signal on lead **619*c* of the low-pass filter 601*c* is buffered by resistor 618*c*** and is provided as an output signal +RAS. The difference between the +RAS signal and the −RAS signal provides either the LF POS or RT POS signal. As discussed above, −RAS is generated in a similar fashion by the almost identical circuit shown in FIG. 6A.

FIG. 3 shows in detail the schematic diagram for the circuitry generating the SOP signal in response to sensing the SOP mark shown in FIG. 1A and the waveform 130 shown in FIG. 1C. FIG. 3 shows two start of plot circuits 3A and 3A′, 3A for a left SOP signal and 3A′ for a right SOP signal. As described above, the two SOP signals are commonly used to measure and then adjust the angle of the print head relative to the print medium 128. In FIG. 3, only the top start of plot circuit 3A will be described with the understanding that the bottom start of plot circuit 3A′ operates in an identical fashion. The corresponding elements of circuits 3A and 3A′ are labelled by the same reference numeral, distinguished by a "′" following the numeral in circuit 3A′ (e.g. resistors **300*a* and 300*a*′**).

This circuit 3A may be partitioned, as shown enclosed in the broken lines of FIG. 3, into functional blocks **144*a*, 144*b*, 149 and 151. These functional blocks correspond to the functional circuit described in FIG. 1D, and the components corresponding in FIG. 3 to the functional blocks in FIG. 1D are enclosed in lines identically numbered. Thus the peak detecting and hold circuits 144*a* and 144*b*, and the comparator 149, are enclosed in broken lines and correspondingly labelled. A hysteresis circuit 151 is included in the implementation of comparator circuit 149 shown in FIG. 3 but is not described in FIG. 1D. As will be explained below, this hysteresis circuit 151 provides a bias voltage for the circuit in FIG. 3 during the sensing of the first portions 111*a* and 111*b* of the SOP mark 111, so as to avoid a trigger of the SOP signal until after the period of time when difference signal 130 swings from its positive peak to its negative peak in waveform segment 130*c* (see FIG. 1C**).

The difference signal 130 produced by the summing network 141 (FIG. 1D, not shown in FIG. 3) is transmitted as input signal LF POS to circuitry 3A on the lead labeled LF POS. The signal LF POS on the lead labelled LF POS is then transmitted to the positive input leads of two peak detecting and hold circuits **144*a* and 144*b* through resistor 300*a*. A voltage divider formed by equal-value resistors 300*a* and 300*b* attenuates signal LF POS by one half to compensate for the attenuation of LF POS at node 145 in the signal path consisting of resistors 306, 308 and 317. The voltage at node 145 is compared to the reference voltage in comparator 149. Operational amplifier (op amp) 301*a* of peak detecting and hold circuit 144*a* follows the positive going peak of the signal LF POS at the non-inverting input lead of op amp 301*a*, while op amp 301*b* of peak detecting and hold circuit 144*b* follows the negative going peak of LF POS at the non-inverting input lead of op amp 301*b***.

The output signal on lead **302*a* from op amp 301*a* is transmitted through diode 303*a* to charge capacitor 304*a* up to the magnitude of the positive peak signal LF POS. Likewise, the negative peak of the signal LF POS as amplified by op amp 301*b* is passed through oppositely poled diode 303*b* to charge capacitor 304*b*** up to the negative peak of the signal LF POS.

The charges stored on capacitors **304*a* and 304*b* can be discharged by analog switch 307. This analog switch 307 is controlled by a signal $\overline{\text{RAS HOLD}}$ on the input lead labeled $\overline{\text{RAS HOLD}}$, transmitted through digital inverter 311. The capacitors 304*a* and 304*b*** are discharged by the software generated signal RAS HOLD in a conventional computer (not shown) in response to the receipt of the SOP signal.

The voltages stored on capacitors **304*a* and 304*b*, the positive and negative peaks of the signal LF POS respectively, are buffered through buffer amplifier (voltage followers) 310*a* and 310*b* and summed at node 148. The summed signal on node 148 is then transmitted through resistor 313 to the negative input lead of comparator 315, thereby entering the comparator stage 149. The positive input lead of comparator 315 is connected to node 145; its voltage value is approximately equal to half the input signal LF POS, when the $\overline{Q}$ output lead of flip-flop 318 is low. Once again, the signal LF POS represents the difference signal from the sensors OP5 and OP6 sensing the light reflected from the SOP mark 111 (FIG. 1A**) of this invention, and discussed hereinabove.

Resistors 306, 308, 316 and 317 form a voltage divider and their values are selected to reduce the amplitude of the input signal LF POS when it reaches node 145 to approximately one-half of its input value on lead LF POS when $\overline{Q}$ is low. Capacitor 309 and resistor 306 form a low-pass filter to eliminate the high frequency noise (greater than 50 Hz) and to introduce a delay to match a delay in the quadrature sensor circuit, to be discussed below, so that the SOP signal generated in the circuit of FIG. 3 will track the tick mark detected by the quadrature sensor circuit. This delay matching is further discussed below in conjunction with sine and cosine blocks of the quadrature sensor circuit in FIS 6A and 6B.

The output signal from comparator 315 is transmitted through digital inverter 320 to node 321. This output signal on node 321 is transmitted to the input lead of inverter 322 and is also used to control the clock, CP, input lead of flip-flop 318.

The output signal from digital inverter 322 triggers flip-flop 323 to produce, as shown, the left side SOP signal (designated $\overline{\text{LF}}$ SOP) on lead labelled LF SOP at the Q output lead of flip-flop 323. As discussed previously, $\overline{\text{LF}}$ POS and $\overline{\text{RF}}$ POS are first used to drive a servo-mechanism to align the angle of the print head to within one tick mark width, and then either one of $\overline{\text{LF}}$ SOP or $\overline{\text{RT}}$ SOP may be used to initiate plotting.

The operation of the circuit in FIG. 3 is now described in detail in conjunction with FIGS. 4A–4I.

Figure 4A:
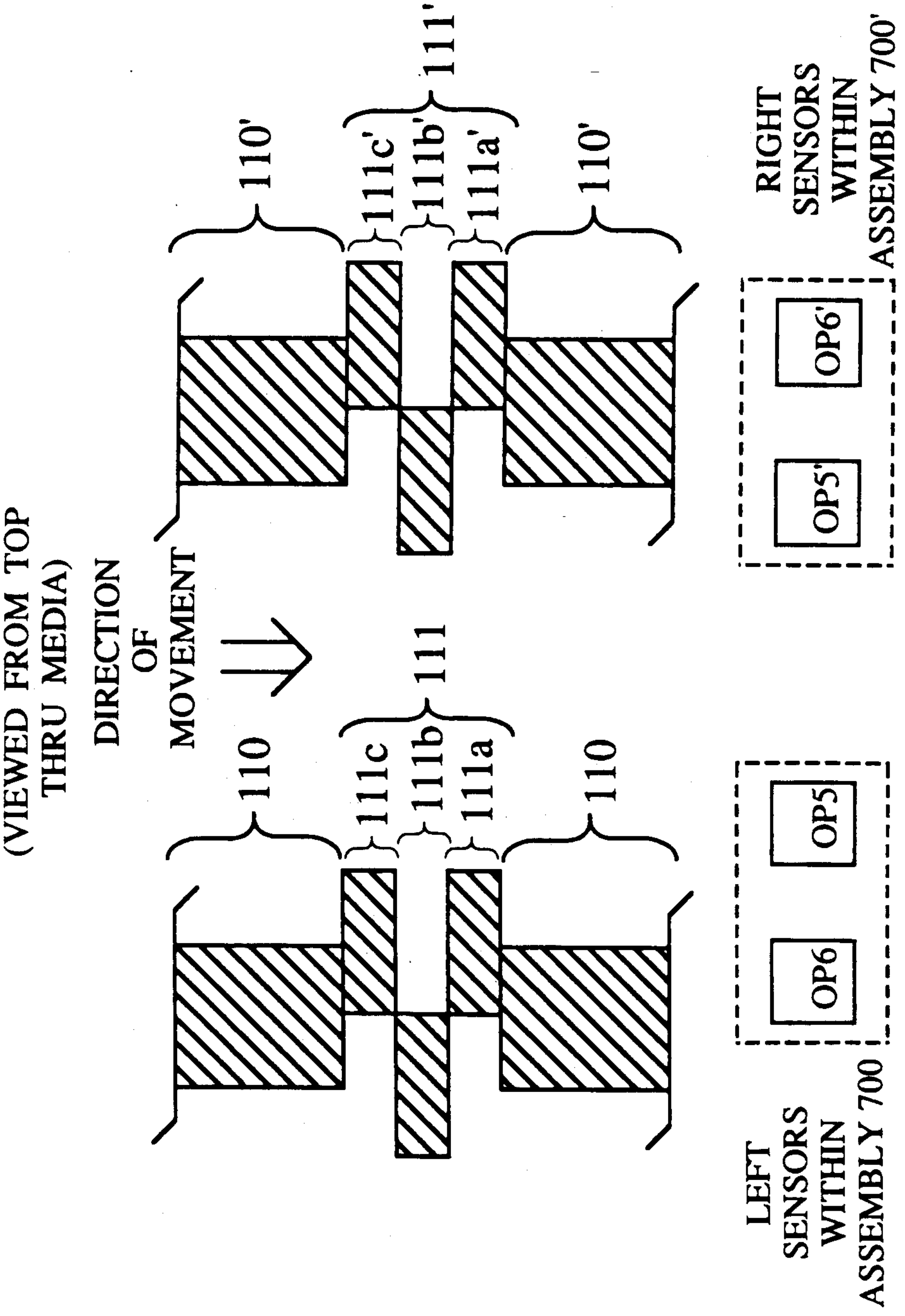
FIGS. 4A to 4I illustrate the operation of the circuit disclosed in FIG. 3.

Referring to FIG. 4A, the SOP marks on either side of the print medium 128 are shown as they appear on the print medium. The view is looking towards the sensors through the print medium as if the print medium was transparent. As discussed above, there are two sensor assemblies, one on each side of the print medium 128 (FIG. 1A). Two SOP mark detecting sensors are within each sensor assembly: OP5 and OP6 on the left side, OP5' and OP6' on the right side (FIG. 4A). Although each of sensors OP5 and OP6 contains one light emitting diode (LED), only one LED is used on each side to provide the radiation to be reflected off the print medium 128. Sensors OP5, OP6, OP5' and OP6' are shown in their proper orientation with respect to the left and right sides of the print medium 128. The positions of each set of SOP mark detecting sensors OP5 and OP6 in the left and right sensor assemblies 700 and 700' are such that approximately one half of each sensor is exposed to tracking line 110, when the tracking line 110 is directly adjacent and properly centered relative to sensors OP5 and OP6.

Two output signals are produced on each side of the print medium 128 when the corresponding SOP mark 111 is detected: on the left, +LRAS (401) from OP5 and −LRAS (402) from OP6; and, on the right, +RRAS (402') from OP5' and −RRAS (401') from OP6'. These output signals are individually shown in FIGS. 4B and 4C. Generation of the +LRAS, −LRAS, +RRAS and −RRAS signals from output circuits of OP5, OP6, OP5' and OP6' are discussed above in conjunction with FIG. 6A. Normally, for example on the left, the SOP mark 111 is not beneath the sensor assembly, so the sensors see a simple line, the control track 110, which is wide enough to cover half of each SOP mark detecting sensor (OP5 or OP6). Each SOP mark detecting sensor (OP5 or OP6) is therefore exposed to a half dark (the tracking line) and half light (the background) image, hence their individual output will then be at some intermediate value between zero and V volts as shown.

Figures 4B, 4C, 4D:
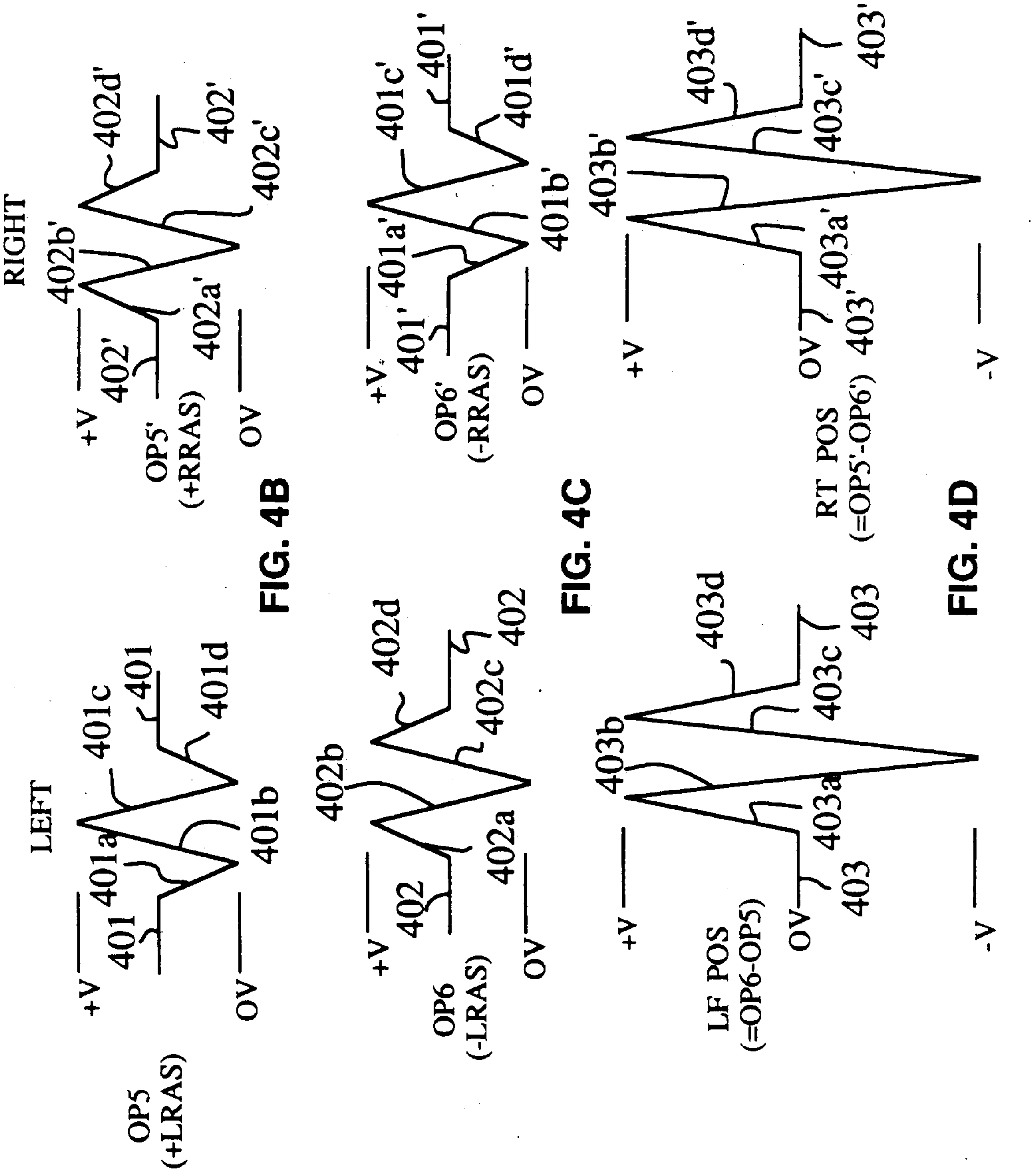

As the first portion 111*a* of the SOP mark 111 moves into the sensor's field, OP5 of the left sensor assembly 700 and OP6' of the right sensor assembly 700' are increasingly exposed to a dark image, signals +LRAS and −RRAS will approach zero volts along waveform segments 401*a* and 401*a*' respectively. At the same time, OP6 of the left sensor assembly 700 and OP5' of the right sensor assembly 700' are increasingly exposed to a completely light image, so that the output signals −LRAS and +RRAS will go along waveform segments 402*a* and 402*a*' respectively to some peak positive voltage +V. When the center portion 111*b* of the SOP mark 111 is positioned over the sensor assemblies 700 and 700', the situation is reversed with OP5 on the left and OP6' on the right being exposed to a completely light image. As a result, the output signals from these sensors increase to a positive peak voltage +V along waveform segments 401*b* and 401*b*' respectively. Simultaneously, sensor OP6 on the left and sensor OP5' on the right are exposed to a completely dark image decreasing their output signals to zero volts as shown by waveform segments 402*b* and 402*b*' respectively (FIGS. 4C and 4B). Finally, when the last portion 111*c* of the SOP mark 111 is positioned above the sensor assemblies 700 and 700', the images on OP5, OP6, OP5' and OP6' are identical to the corresponding images when the first portion 111*a* of the SOP mark 111 is positioned above the sensor assembly Hence the output signals from OP5 and OP6' go to zero volts along waveform segments 401*c* and 401*c*', while the output signals from OP6 and OP5' go to +V volts along waveform segments 402*c* and 402*c*'.

Figures 4E, 4F:
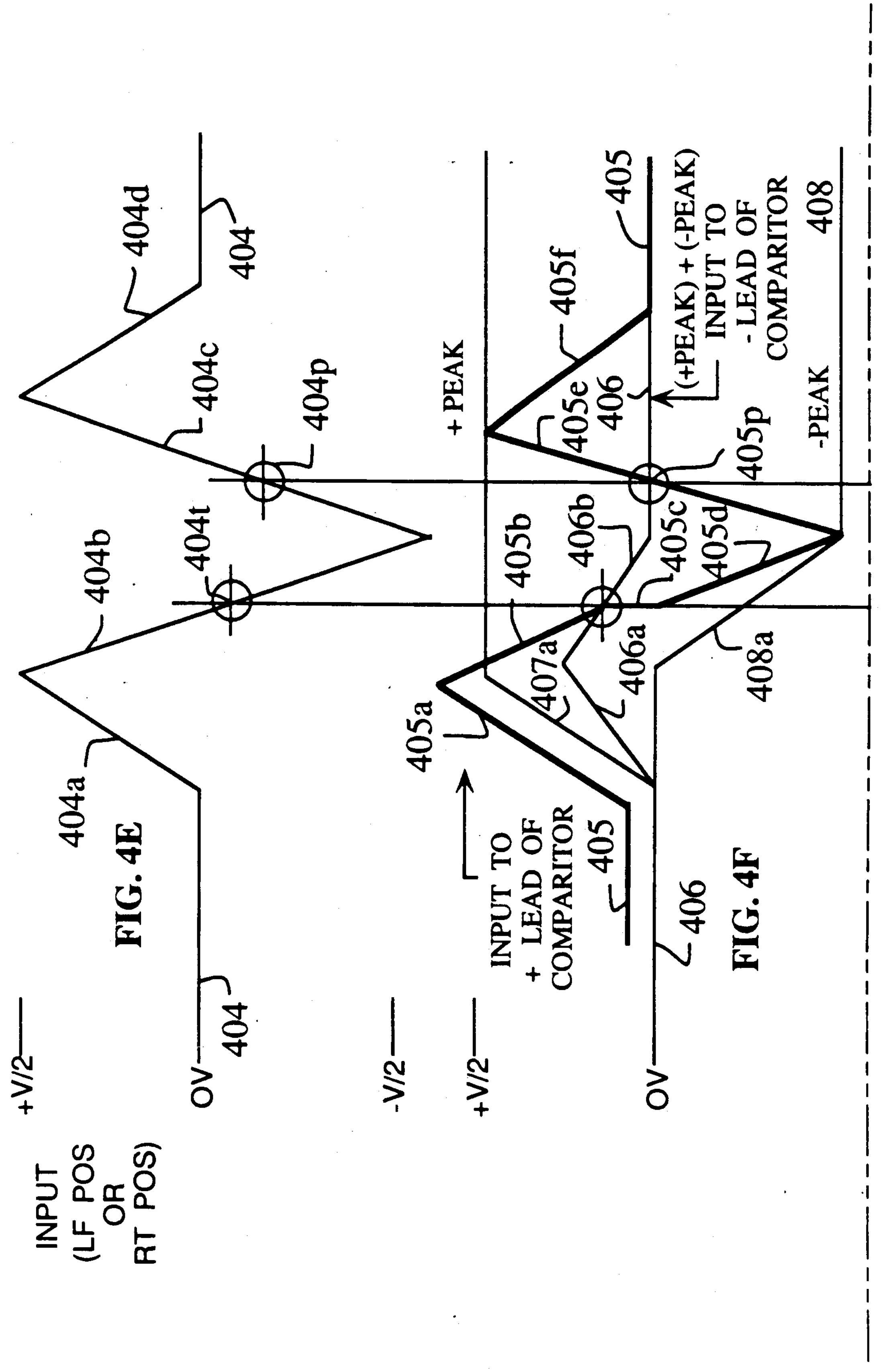
Figures 4G, 4H, 4I:
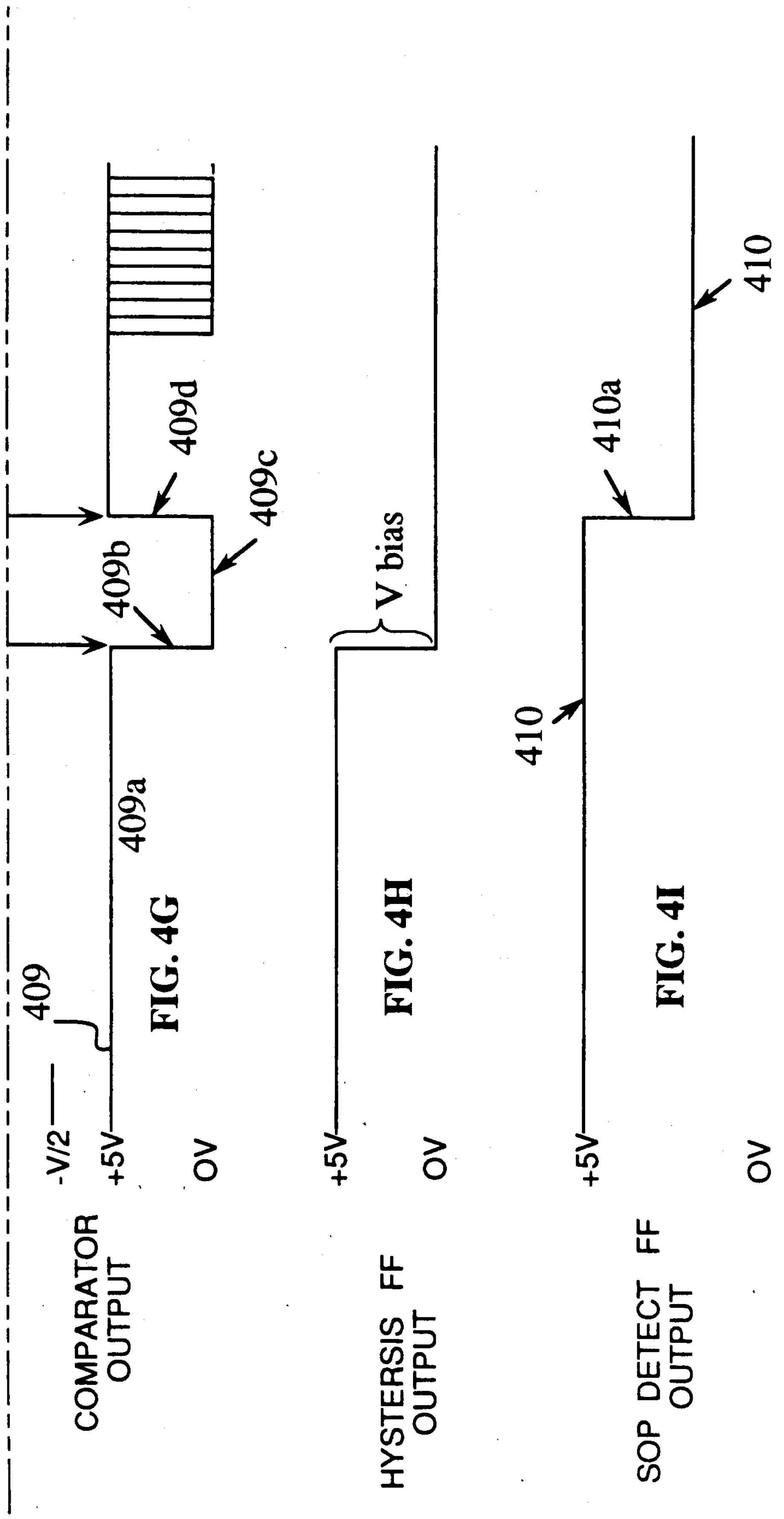

In the left sensor assembly 700, the output signal from OP5 is subtracted from the output signal from OP6 to form the LF POS signal shown as the left waveform 403 in FIG. 4D. The corresponding signal 403' on the right is the output signal from OP6' subtracted from the output signal from OP5' forming the RT POS signal. These waveforms 403 and 403' are the same as the difference signal 130, extensively described above in conjunction with FIGS. 1A–D and FIG. 2D. Since the generation of the SOP signal is the same on either side of the print medium 128, FIG. 4E represents either one of LF POS or RT POS signals. The time and voltage scales in FIG. 4E are expanded for clarity.

FIG. 4E shows the LF POS signal as it would appear at the positive lead of the comparator 315 (FIG. 3), if the hysteresis bias voltage on the $\overline{Q}$ output lead of flip-flop 318 is not present. At the positive input lead of comparator 315, this LF POS signal is attenuated to one-half of its input value, since there is a resistor voltage divider (formed by resistors 306, 308, 316, and 317) in its path.

Because the $\overline{Q}$ output signal of the hysteresis flip-flop 318 is summed with this attenuated LF POS signal, the actual input signal on the positive lead of the comparator 315 is shown as the thick line waveform 405 in FIG. 4F. The output signals of the plus and minus peak detecting and hold circuits 144*a* and 144*b* respectively are also shown as waveforms 407 and 408 in FIG. 4F. Their sum is shown as waveform 406, which is the signal at node 148 (FIG. 3) at the negative input lead of comparator 315.

Initially, the peak hold capacitors 304*a* and 304*b* are discharged and the hysteresis flip-flop 318 is in a reset position ($\overline{Q}$ high). This is accomplished by the software generated signal $\overline{\text{RAS}}$ HOLD resetting analog switch 307 and setting $\overline{\text{CLR}}$ input of the hysteresis flip-flop 318. This signal $\overline{\text{RAS}}$ HOLD performs initialization in preparation for the detection of the next SOP mark.

As the first portion 111*a* of the SOP mark 111 crosses the sensors, the input signal LF POS (FIGS. 4E and 4F) moves positive along waveform segment 407*a*. The positive peak detecting and hold circuitry 144*a* follows input signal LF POS, to one-half of the positive excursion along waveform segment 407*a* until the peak value +V/2 is reached. The peak value is +V/2 because of voltage divider formed by resistors 300*a* and 300*b*.

As the center portion 111*b* of the SOP mark 111 crosses the sensor assembly 700, the input signal LF POS (FIG. 4E) swings through zero to a negative peak value along waveform segment 404*b*. Again, because of voltage divider formed by resistors 300*a* and 300*b*, the negative peak detecting and hold circuitry 144*b* follows one-half of this negative excursion to a value of −V/2 along waveform segment 408*a* (FIG. 4F).

As the last portion 111*c* of the SOP mark 111 crosses the sensors OP5 and OP6 (or OP5' and OP6' on the right side), the input signal 404 swings back through zero to a positive peak along waveform segment 404*c*. During this excursion of the input signal LF POS the SOP signal (LF SOP or RT SOP) is activated at crossover point 404*p*.

During the first portion 111*a* of the SOP mark, the signal on the $\overline{Q}$ output lead of flip-flop 318 is set to the "high" voltage state equal to the initial voltage of waveform 405, in anticipation of the detection of the SOP mark 111. Since the negative peak detecting and hold circuit 144*b* is at zero volts initially, the signal on negative input lead (equal to voltage at node 148) to the comparator 315 will see a rise to one-quarter of the peak 26 value V/4 along waveform segment 406*a* due to the voltage divider formed by resistors 312*a* and 312*b*. At this time, the positive input lead to comparator 315 shown as waveform 405 sees one-half LF POS plus approximately one-half the voltage on the $\overline{Q}$ output lead of the hysteresis FF 318. As a result of this added voltage from the $\overline{Q}$ output lead of flip-flop 318, the voltage at the positive input lead of comparator 315 will remain higher than the voltage at the negative input lead of comparator 315 during the period between initialization by signal $\overline{\text{RAS}}$ HOLD and portion 111*a* of SOP mark 111 coming completely into the field of OP5. Hence, comparator 315 will not change state during this period to avoid in a false triggering of the SOP signal. Without the added voltage during part of this period, both LF POS and the voltage on node 148 are substantially at zero volts, such that small fluctuation due to noise in the environment may cause comparator 315 to change state. Only during the transition to the center portion 111*b* of the SOP mark will the input voltage swing sufficiently negative to cause the output of the comparator 315 to change state at crossover point 404*t* along waveform segment 409*b*. This change of state (going low) at waveform segment 409*b* to zero volts at 409*c* sets the hysteresis FF 318 which removes the added bias voltage $V_{bias}$ to the positive input of the comparator 315.

When the center portion 111*b* of the SOP mark 111 moves past the sensors, signal LF POS swings to the negative peak along waveform segment 404*b*. As in the positive peak detecting and hold circuit 144*a*, previously described, the negative peak detecting and hold circuitry 144*b* follows one-half of this value to level −V/2 along waveform segment 408*a*. Again, the output signals of the positive and negative peak detecting and hold circuits are summed at node 148, which is fed into the negative input lead of the comparator 315. The positive and negative peak voltages detected at the peak detecting and hold circuits 144*a* and 144*b* provide the threshold to which one-half of the signal LF POS (waveform 405) as attenuated at node 145 will be compared At crossover point 405*p*, when one-half of signal LF POS equals the voltage level at node 148, the comparator 315 will go from a low to a high state along waveform segment 409*d* setting the SOP DETECT FF 323, thus signaling the detection of the SOP mark by bringing signal $\overline{\text{LF}}$ SOP low along waveform segment 410*a*.

$\overline{\text{RT}}$ SOP is generated in a like manner in the circuit 3A' shown in FIG. 3, which operates substantially in the same manner as circuit 3A described above.

The circuit for generating the quadrature signal is next described.

As shown in FIG. 6A, the sensors in the sine block are denoted OP1 and OP2. Referring to OP1: pin 1 is connected to a +12 volt power supply and anode of LED D1; pin 2 is connected to the cathode of LED D1 and through a resistor designated 600*a* to ground; pin 3 is connected to the +12 volt power supply and the collector of phototransistor Q1; and pin 4 is connected to the emitter of Q1 and resistor 600*e*. The other terminal of 600*e* is connected to another resistor 600*f*, which is in turn connected in series at 600*f*'s other terminal with pin 3 of the sensor OP2. Referring to OP2: pin 1 is connected through the resistor 600*b* to ground and anode of LED D2; pin 2 is connected to the cathode of LED D2 and a −12V supply, pin 4 is connected to the −12 volts power supply and emitter of phototransistor Q2, and pin 3 is connected to the collector of phototransistor Q3. Resistors 600*a* to 600*d* are current setting resistors. The values of resistors 600*a* to 600*d* are determined at manufacture time so as to achieve a zero current output at lead 602*a* when sensors OP1 and OP2 are exposed to a 50% dark and light image formed by superimposing orthogonally a tick mark track onto the Ronchi rulings 701*a*–*d*. The common terminal of 600*e* and 600*f* is designated the SINE output. This output signal, designated 602*a*, moves off schematic diagram FIG. 6A into FIG. 6B as the pin 10 SINE input lead, also labelled 602*a*.

Figure 6B:
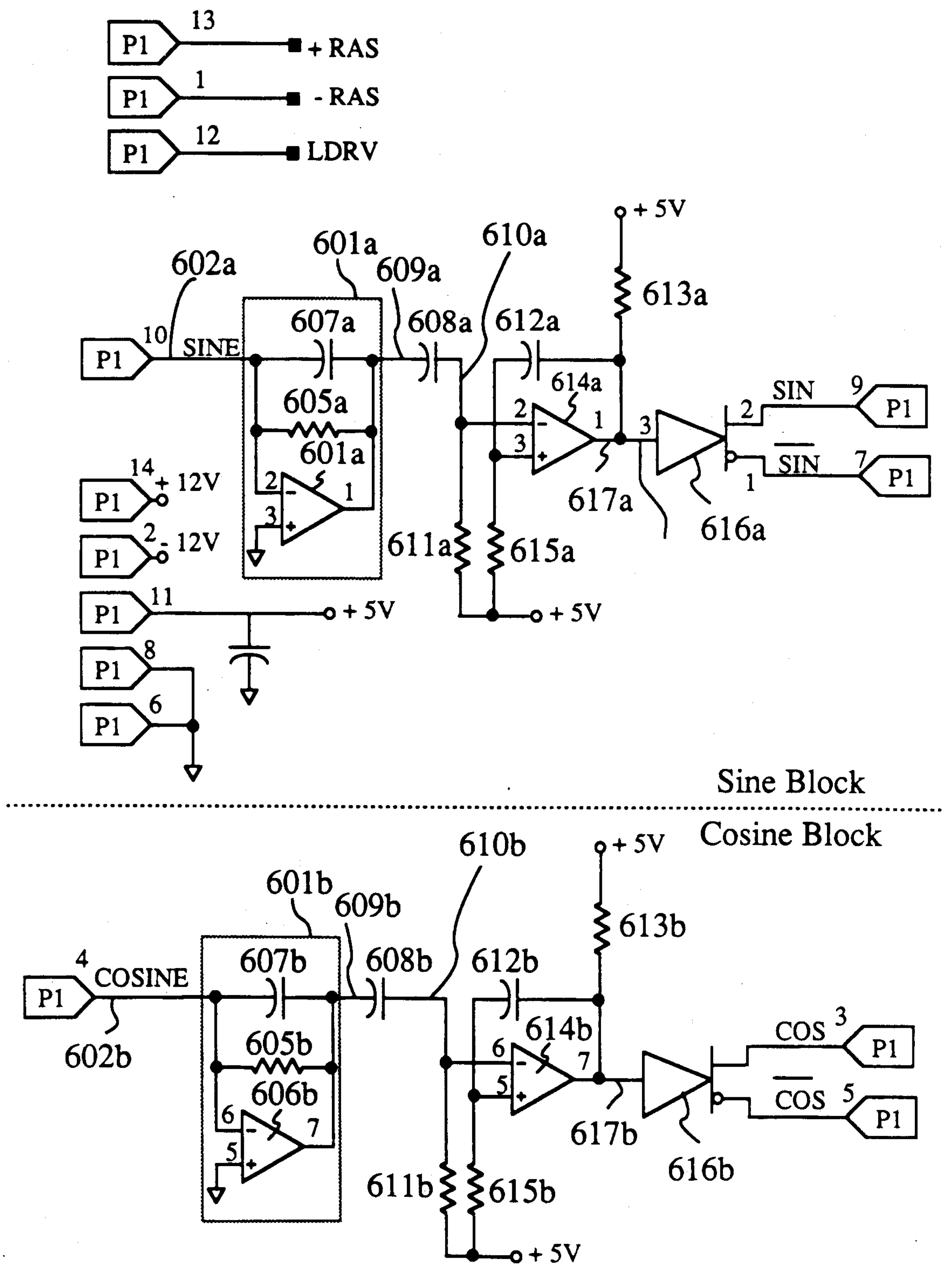
Figure 7A:
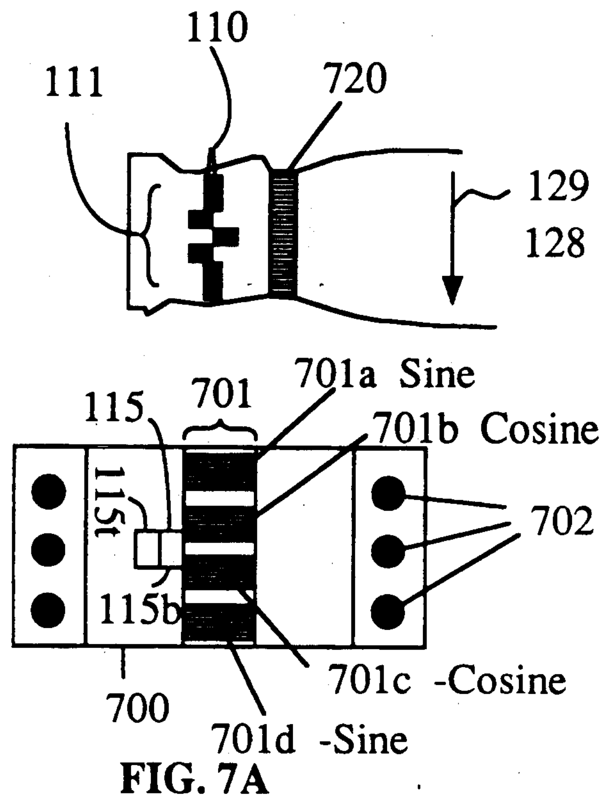
FIG. 7A is a plan view showing the location of the sensor assembly 700 with respect to the start of plot mark 111 and the moving tick marks 720 on the print medium.
Figure 7B:
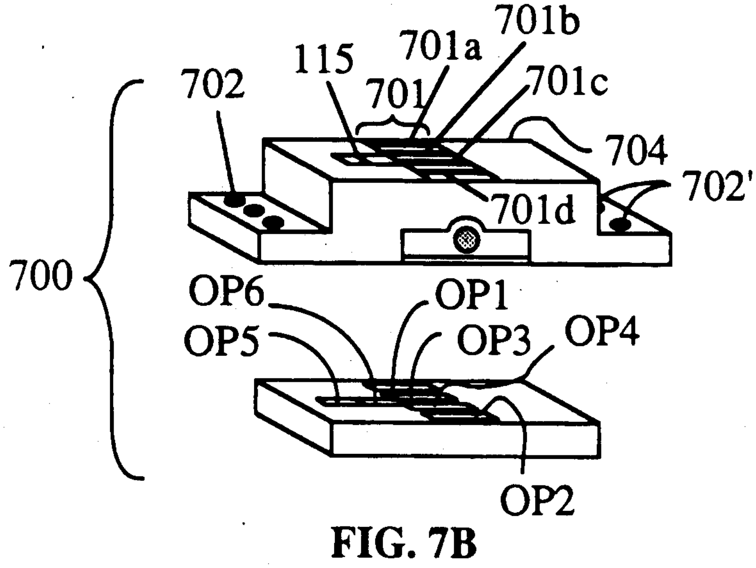
FIG. 7B is an isometric view of the sensor assembly 700 showing the location of the quadrature gratings 701*a*, 701*b*, 701*c* and 701*d* relative to sensors OP1, OP3, OP4 and OP2 and the location of apertures 115*t* and 115*b* relative to sensors OP5 and OP6.
Figure 7C:
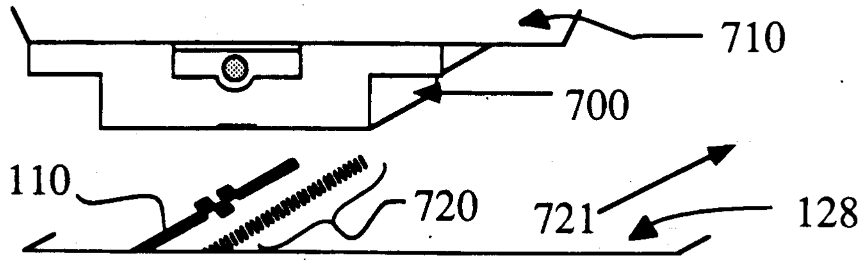
FIG. 7C is an isometric view of the sensor assembly 700 in relation to the moving medium.
Figure 7D:
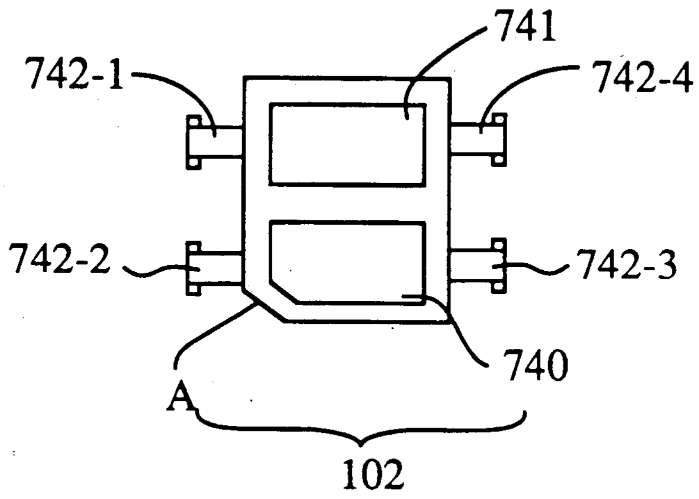
FIG. 7D is a plan view of an LED phototransistor package used to implement any of sensors OP1–OP6.
Figure 7E:
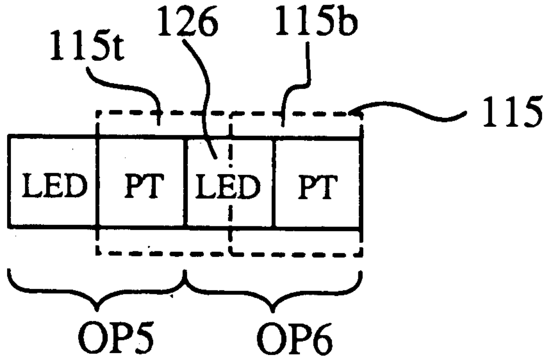
FIG. 7E shows the locations of the LED and phototransistor packages of OP5 and OP6, relative to the position of regions 115*t* and 115*b* of aperture 115 so as to ensure that only light from the LED associated with sensor OP6 is detected by the phototransistors of sensors OP5 and OP6.

Referring now to FIG. 6B, the current in lead 602*a* generated by sensors OP1 and OP2 through SINE input (Pin 10) is converted into a voltage on lead 609*a* by a low-pass filter circuit 601*a* (enclosed in the broken lines), comprising the op amp 606*a*, the resistor 605*a* and the capacitor 607*a*. Capacitor 607*a* and resistor 605*a* are connected in parallel across the inverting input lead and the output lead of op amp 606*a*. The non-inverting input lead of op amp 606*a* is connected to common ground. The output signal in lead 609*a* of op amp 606*a*, hence the output signal in lead 609*a* of this low-pass filter circuit 601*a*, is passed through a differentiation circuit consisting of capacitor 608*a* and resistor 611*a* to attenuate any DC component resulting from the sensors OP1 and OP2 sensing the reflectivity variations of the medium or printed image. Resistor 611*a* is connected at its other terminal away from capacitor 608*a* to a +5V supply. Capacitor 608*a* and resistor 611*a* form a differentiation network. The voltage across resistor 611*a* is in direct proportion to the rate of change of the input signal on lead 609*a*. Thus, since this input signal on lead 609*a* is roughly triangular in form, as will be shown below, the waveform of the voltage across resistor 611*a* will be a square wave which leading (positive going) transitions will be coincident with the positive peak of the triangle wave on lead 609*a*. Furthermore, the positive amplitude of this square wave voltage across resistor 611*a* will be in direct proportion to the rate of change of the positive slope of the voltage of the input waveform on lead 609*a* (dv/dt) while the negative amplitude of the square wave voltage across resistor 611*a* will be in direct proportion to the rate of change of the negative slope of the input waveform of the voltage on lead 609*a*. Also, since the reflectivity of the printed image and of the medium is not perfectly uniform, a low frequency (as compared to the signal frequency and less than 50 Hz) noise will be generated which would cause an erroneous variation in the spacing of the resulting printed line. This low frequency noise is attenuated by this differentiation network of capacitor 608*a* and resistor 611*a* resulting in an improvement in print accuracy.

The output signal on lead 610*a* of this differentiation circuit is taken at the junction of capacitor 608*a* and resistor 611*a*. This output signal on lead 610*a* is transmitted to the negative input lead of comparator 614*a*. The positive input lead of comparator 614*a* is also connected to a +5V power supply through resistor 615*a*. The negative input lead of the comparator 614*a* is connected to the same +5V power supply through resistance 611*a*. Capacitor 612*a* is connected to output lead 617*a* and positive input leads of comparator 614*a*. Capacitor 612*a* and comparator 614*a* form an "AC hysteresis" circuit, to eliminate glitches in the state changes of the square wave and to convert the output signal on lead 610*a* of capacitor 608*a* into a clean square wave with the desired voltage swing. The output is also connected to a +5V power supply through resistor 613*a*.

The output signal on lead 617*a* of comparator 614*a* is transmitted to line driver 616*a* which provides two complementary output signals $\overline{\text{SIN}}$ and SIN at pins 7 and 9 respectively, for reliable transmission to other circuitry.

Since the cosine blocks of the sensor boards shown in FIGS. 6A and 6B are identical to the corresponding sine blocks described above, they will therefore not be described in detail, other than pointing out that the COS and $\overline{\text{COS}}$ outputs are provided in pin 3 and pin 5, respectively for reliable transmission to other circuits.

Having described the schematic structure of the sensor boards, the operation of the sine and cosine blocks is now described for the sensor assembly 700.

Figure 8A:
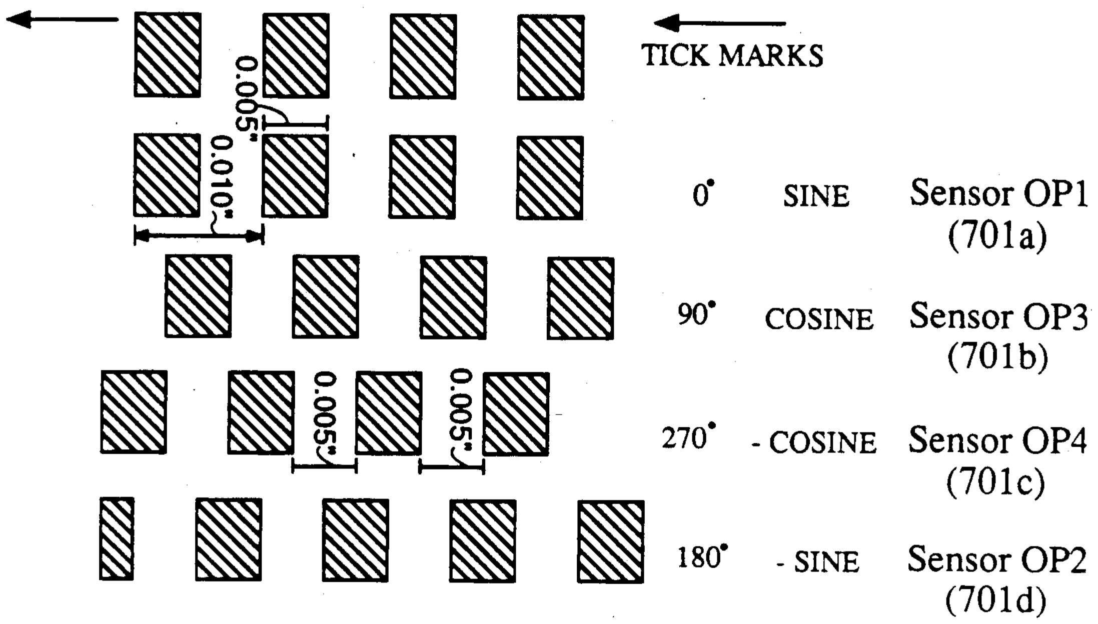
FIG. 8A shows the relative positions of the Ronchi gratings 701*a*, 701*b*, 701*c* and 701*d* in the sensor assembly 700 shown in FIG. 7A used to generate quadrature output signals with respect to the moving tick marks 720 (FIGS. 5 and 7A) on the print medium.

As mentioned above, a preferred embodiment has the quadrature sensor assembly 700 (FIG. 7A) having a transparent window 701 engraved with four sets of Ronchi gratings 701*a*–*d*. FIG. 8A shows the relative position of each grating with respect to the moving tick marks at one instant in time, $t_o$. In this implementation, the separation between tick marks and the width of each tick mark are each 0.005 inches ("one on, three off" configuration, recalling that the dot size is approximately 0.005 inches). The opaque rulings on the grating are designed such that their widths and separations are substantially the same as those of the tick marks. As shown in FIG. 7A, there are 4 sets of gratings 701*a*–*d* in the sensor assembly 700 positioned such that when the first set of gratings 701*a* is in phase with the moving tick marks, i e. when each opaque ruling is directly below and completely overlapping a tick mark, the next set of grating 701*b* is 90° out of phase, the third set of grating 701*c* is 270° out of phase, and the fourth set of gratings 701*d* is 180° out of phase. FIG. 8A shows the relative position of each grating at the time $t_o$, when grating 701*a* is in phase with the moving tick marks. By this arrangement of the gratings, the center point of rectangular window 701 is coincident with the center points of two sets of grating each 180° apart in phase (701*a* and 701*d*, 701*b* and 701*c*), misalignment errors of the type related to the print medium being at an angle to the rulings may be minimized.

At time $t_o$, the first set of gratings 701*a* allow the maximum amount of light to the sensor OP1 because the light portion of the tick mark track is not occluded by the opaque rulings on the grating. Similarly, it is readily seen that the sensors OP3 and OP4 behind the second and third sets of gratings respectively (701*b*, 701*c* respectively) will see some intermediate levels in intensity of light because the opaque rulings are partially occluding the light path from the tick mark track to the sensors OP3 and OP4, while the fourth set of grating 701*d* will accordingly see the lowest intensity of light at its sensor OP2 having complete overlap of the opaque ruling and the light portions of the tick mark track.

Figure 8B:
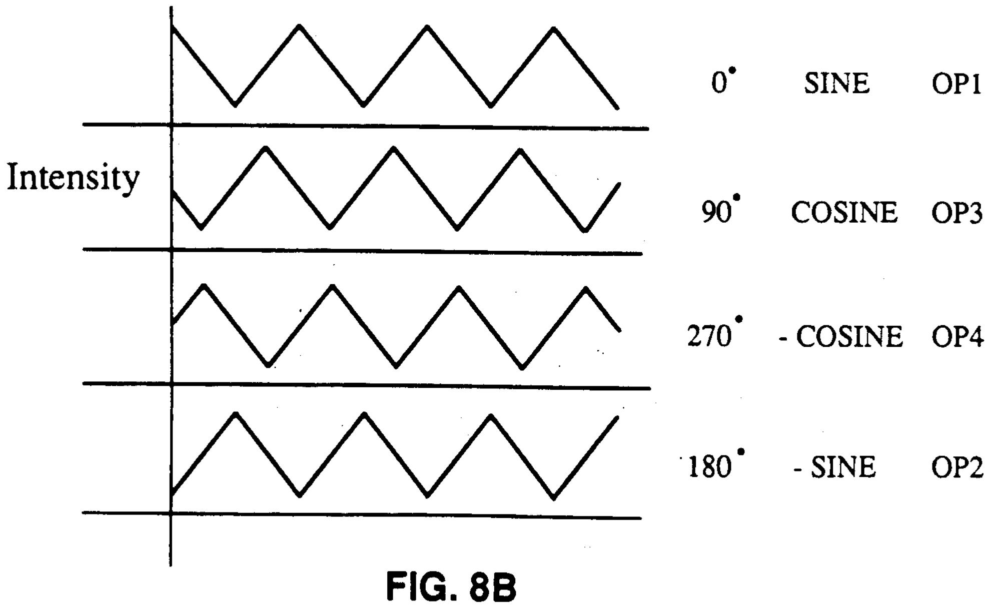
FIG. 8B shows the waveforms generated by the quadrature sensors OP1, OP3, OP4 and OP2 shown in FIG. 5 as a result of the tick marks 720 (FIG. 7A) on the print medium moving past the Ronchi gratings 701*a*, 701*b*, 701*c*, 701*d* (FIGS. 5, 7A and 7B) in sensor assembly 700.

As the medium 128 moves from right to left, the intensities of light sensed at the sensors OP1 and OP3 behind the first 701*a* and second 701*b* gratings respectively decrease as more of the dark portions of the tick mark track moves into the transparent spacings of these gratings. At the same time, the opposite effect—increasing intensities—take place at the sensors OP4 and OP2 behind the third and fourth (701*c* and 701*d* respectively) sets of gratings. Hence, if one plots the intensity of light sensed at these sensors, the result will be the periodic waveforms as shown in FIG. 8B.

The four sensors OP1–OP4 will each draw a current modulated by the intensity sensed. These four currents are then combined into two currents at nodes 602*a* and 602*b* (FIG. 6A), each combined current being the sum of the intensities of sensors placed 180° apart. Because the sensor OP1 produces positive current flowing out of pin 4 of OP1 while sensor OP2 produces negative current flowing into pin 3 of OP2, by summing the output currents of OP1 and OP2, a bipolar current signal is produced at node 602*a*. This signal has better symmetry properties over that produced from an individual sensor, since a mismatch between line width of the image and the ruling line width often produces opposite effects at sensors placed 180° apart. This is because as the intensity of light increases at OP1 and so produces a greater positive current, the intensity of light decreases at OP2 and so reduces its output of negative current. The resulting sum of these currents is positive and is accentuated by the opposite effects at the respective sensors. A similar accentuation occurs as the intensity of light sensed by sensor OP1 decreases, its positive current decreases while the intensity of light sensed by sensor OP2 increases and its output of negative current increases. The resulting sum of these currents is negative. Hence, the total excursion (+peak to −peak) is twice that from any individual sensor. For this reason also, sensors OP3 and OP4 are similarly connected to take advantage of the signal symmetry properties.

The combined currents 602*a* and 602*b* on leads labelled SINE and COSINE respectively are converted to voltages on leads 609*a* and 609*b* respectively using low-pass filter circuits 601*a* and 601*b* respectively (FIG. 6B). The output currents corresponding to Ronchi grating of phase 0°, 90°, 270°, 180° are named sine, cosine, −sine and −cosine respectively. FIG. 8B is labelled accordingly.

Referring to FIG. 6A, it is clear then, as the light intensities varies at the sensors OP1 and OP2, the phototransistor currents of Q1 and Q2 are accordingly modulated. The currents are summed as a current signal on lead 602*a* at the node labelled SINE, corresponding to Pin 10 in FIG. 6A, and is transmitted to the circuit on FIG. 6B. This current signal on lead 602*a* is converted into a voltage signal on lead 609*a* by the low-pass filters 601*a* consisting of capacitor 607*c*, resistor 605*a*, and op amp 606*a*. The differentiation circuit of capacitor 608*a* and resistor 611*a* attenuates DC bias as well as low frequency signals resulting from primarily two sources: a variation of reflectivity (called "mottling") on the print medium 128 produces the low frequency signal; and an imbalance of current setting resistors 600*a* to 600*d* which have a 10% tolerance at each of sensors OP1–OP4, may produce a DC bias voltage which needs to be attenuated.

The voltage signal on lead 609*a* is a triangular waveform with a DC bias. The differentiation circuit of capacitor 608*a* and resistor 611*a* removes the DC bias as well as transforming the triangular waveform of the signal on lead 609*a* into the signal on lead 610*a* having a roughly square waveform. The transitions of the signal on lead 610*a* correspond to the peaks of the triangular waveform of the signal on lead 609*a*. The transitions of this voltage signal on lead 610*a* toggle the output signal of comparator 614*a*, creating a clean square wave at node 617*a* with TTL level signals. The line driver 616*a* provides as complementary output signals SIN and $\overline{\text{SIN}}$, to provide noise immunity during transmission to circuits external to sensor assembly 700.

Figure 9:
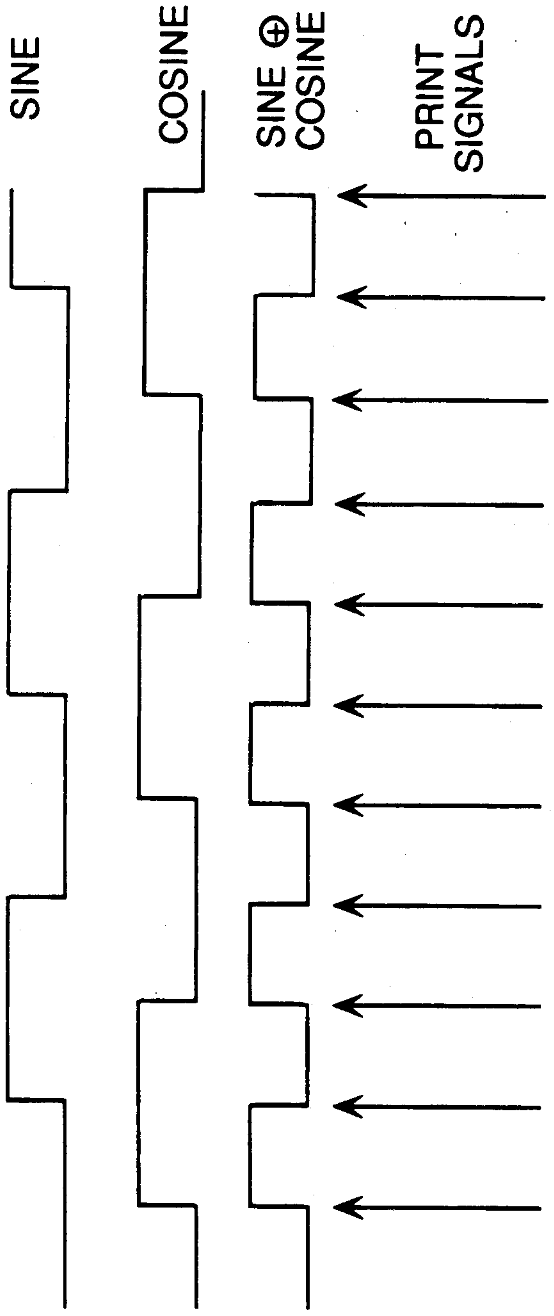
FIG. 9 shows the exclusive OR operation of the sine and cosine waveforms generated by the quadrature sensors OP1, OP3, OP4, OP2 shown, to result in the print signals for each plot line on the print medium.

The cosine square waves (COS and $\overline{\text{COS}}$ in FIG. 6B) are generated in a similar fashion from the output signals of sensors OP3 and OP4. The signals SIN and $\overline{\text{SIN}}$ are received by a differential line receiver of circuitry external to sensor assembly 700 and combined to reproduce the original signal. The signals COS and $\overline{\text{COS}}$ are processed in a like manner. Thus, the resulting two signals SINE and COSINE contain information as to the position of each print line. This information is present at the instant of every transition of the square waves SINE and COSINE. These signals are exclusive-OR'd to produce a third signal of twice the frequency where each transition is indicative of the position of a print line. This resulting square wave has twice frequency of the component waves, as illustrated in FIG. 9. Each edge of this wave provides a trigger for a print line.

Hence, the concurrence of the SOP signal and the edge of the exclusive-ORed signal thus generated, triggers the start of plot at the correct print line.

The following is a list of component values, or part numbers of suitable integrated circuits used to implement the circuits shown in FIGS. 3, 6A and 6B.

LIST OF COMPONENTS: M-990

| Component | Value |
|---|---|
| 300a, 300b, 300a', 300b' | 22K ohms |
| 301a, 301b, 301a', 301b' | TL082 |
| 303a, 303b, 303a', 303b' | 1N914 |
| 304a, 304b, 304a', 304b' | 1.0 μf |
| 307, 307' | DG201 |
| 309, 309' | .047 μf |
| 310a, 310b, 310a', 310b' | TL082 |
| 311 | 74LS14 |
| 306, 308, 306', 308' | 100K ohms |
| 312a, 312b, 312a', 312b' | 22K ohms |
| 313, 313' | 100K ohms |
| 315, 315' | LM311 |
| 316, 316' | 470K ohms |
| 317, 317' | 330K ohms |
| 318, 318' | 74LS74 |
| 320, 320' | 74LS14 |
| 319, 319' | 2.2K ohms |
| 322, 322' | 74LS14 |
| 323, 323' | 74LS74 |
| 600a, 600b, 600c, 600d | SELECT |
| OP1, OP2, OP3, OP4, OP5, OP6 | MTRS9070 |
| 600e, 600f, 600g, 600h | 100 ohms |
| 603c | 200K ohms |
| 603b | SELECT |
| 605c, 605d | .001 μf |
| 618c, 618d | 100 ohms |
| 607a, 607b | .01 μf |
| 605a, 605b | 300K |
| 606a, 606b | TL062 |
| 608a, 608b | .01 μf |
| 611a, 611b, 615a, 615b | 300K ohms |
| 612a, 612b | .001 μf |
| 614a, 614b | LM393 |
| 613a, 613b | 4.7K ohms |
| 616a, 616b | 75158 |

The above description is exemplary only and is not meant to be limiting. Many modifications within the scope of this invention will be obvious to one of ordinary skill in the art. Therefore, it is intended that the following claims define the present invention and the scope thereof.

What is claimed is:

1. A three portion mark for use on a print medium to indicate the start of plot of print lines on the print medium, comprising:

a first portion of said mark above a reference line;

a second portion of said mark beneath the reference line directly following in space the first portion; and a third portion above the reference line, said third portion being spaced from the first portion by the width of the second portion.

2. A mark as in claim 1 wherein said first, second, and third portions are of substantially the same uniform color.

3. A three portion mark for use on a print medium to indicate start of plot as in claim 1, wherein said first, second and third portions of said mark are rectangular.

4. A three portion mark for use on a print medium to indicate start of plot as in claim 1, wherein said first, second and third portions of said mark are dark with respect to said print medium.

5. A three portion mark for use on a print medium to indicate start of plot as in claim 1, wherein said first, second and third portions of said mark are equal in area.

6. A mark as in claim 1, wherein said first portion protrudes above said reference line the same distance as said second portion protrudes beneath said reference line.

7. A mark as in claim 1 wherein said third portion and said first portion each protrude the same distance above said reference line.

8. A mark as in claim 1 wherein said third dark portion has an area at least 50% the size of said second dark portion.

9. A mark as in claim 8 wherein said third dark portion protrudes the same distance as said first dark portion protrudes above said reference line.

10. A method for generating a start of plot signal for use on a print medium, comprising the steps of:

providing a three portion SOP mark on said print medium, said three portion SOP mark having in sequence a first portion above a reference line, a second portion below said reference line and a third portion above said reference line;

sensing said first portion of said mark, and computing a first quantity proportional to the size of the area sensed:

sensing said second portion of said mark and computing a second quantity proportional to the size of area sensed;

computing a third quantity proportional to the difference of the peak values of said first and second quantities;

sensing said third portion of said mark and providing a fourth quantity proportional to the size of area sensed;

and issuing a start of plot signal when said fourth quantity equals said third quantity.

11. A method for generating a start of plot signal for use on a print medium as recited in claim 10, wherein the sensing steps are accomplished by using sensors responding to reflected light incident upon said three portion SOP mark.

12. A method for generating a start of plot signal for use on a print medium as recited in claim 10, wherein said first, second, third and fourth quantities are voltages.

13. A circuit for generating a start of plot signal for use on a print medium, comprising:

sensing means for sensing a three portion start of plot mark printed on said print medium and providing a output signal proportional to the amount of light and dark areas sensed;

first detecting means for detecting a positive peak value of said output signal in said sensing means;

second detecting means for detecting a negative peak value of said output signal in said sensing means;

summing means for providing a difference signal proportional to the difference of said positive and negative peak values detected; and signal generation means for providing an SOP signal when said output signal of said sensing means is equal to said difference signal of said summing means.

14. A circuit as in claim 13 for generating a start of plot signal for use on a print medium, wherein said sensing means comprises a plurality of phototransistors.

15. A circuit as in claim 14 for generating a start of plot signal for use on a print medium, wherein said sensing means further comprises:

converting means for converting the output signals of said plurality of phototransistors into a plurality of voltages, each voltage being proportional to one of said output signals of said plurality of phototransistors.

16. A circuit as in claim 13 for generating a start of plot signal for use on a print medium, wherein said first detecting means comprises:

an operational amplifier having an output lead and a negative input lead;

a capacitor having a positive lead and a negative lead, said negative lead connected to a ground reference; and a diode having an anode and a cathode, said cathode connected to said output lead of said operational amplifier said anode connected to said positive lead of said capacitor and said anode also connected to said negative input lead of said operational amplifier, such that said diode conducts whenever the voltage of said output lead of said operational amplifier exceeds the voltage on said positive lead of capacitor.

17. A circuit as in claim 13 for generating a start of plot signal for use on a print medium, wherein said second detecting means comprises:

an operational amplifier having an output lead and a negative input lead;

a capacitor having a positive and a negative lead, said negative lead connected to a ground reference; and a diode having a cathode and an anode, said anode connected to said output lead of said operational amplifier, cathode connected to said positive lead of said capacitor, and said cathode connected to said negative input lead of said operational amplifier such that said diode conducts whenever the voltage of said output lead of said operational amplifier is less than the voltage on said positive lead of said capacitor.

18. A circuit as in claim 16 for generating a start of plot signal for use on a print medium, further comprising a switch providing a path to discharge said capacitor.

19. A circuit as in claim 17 for generating a start of plot signal for use on a print medium, further comprising a switch providing a path to discharge said capacitor.

20. A circuit as in claim 13 for generating a start of plot signal for use on a print medium, wherein said signal generation means comprising a comparator.

21. A circuit as in claim 13 for generating a start of plot signal for use on a print medium, wherein said signal generation means comprising hysteresis means for providing a bias to be added to said output signal of said sensing means, such that triggering of said SOP signal does not occur until said bias is removed.

22. A circuit as recited in claim 21 for generating a start of plot signal for use on a print medium, wherein said hysteresis means comprises a flip-flop.

23. A system for marking positions on a moving print medium, comprising:

a series of equally spaced tick marks printed on said print medium, each of said tick marks having a width substantially equal to the spacing between successive tick marks;

a plurality of patterns, mounted on an apparatus, each pattern substantially the same as a section of said series of tick marks, and each of said plurality of patterns is positioned such that when one of said plurality of patterns is matched against said series of tick marks as said series of tick marks moves with said moving print medium, the rest of said plurality of patterns are each lagging a different angular distance from said moving series of tick marks;

projecting means for superimposing an image of said moving series of tick marks on to said apparatus; and sensing means for sensing the position of said image of said moving series of tick marks relative to each of said plurality of patterns, and providing a signal whenever said image of said moving series of tick marks coincides substantially with one of said plurality of patterns.

24. A system as in claim 23 for marking positions on a moving print medium, wherein said plurality of patterns comprises a first set of grating having a plurality of rulings, each ruling separated from the next ruling by a ruling space substantially equal to the spacing between successive tick marks in said series of tick marks and each of said plurality of ruling having a width substantially equal to said ruling space; and a second set of grating substantially equal to said first set of grating and said second set of grating positioned such that when said first set of grating is aligned with respect to said series of tick marks, said second set of grating is positioned 180° out of phase with respect said series of tick marks.

25. A system as in claim 23, for marking positions on a moving print medium, wherein said plurality of patterns comprises:

a first set of grating having a plurality of rulings, each ruling separated from the next ruling by a ruling space substantially equal to the spacing between successive tick marks in said series of tick marks, and each of said plurality of rulings having a width substantially the same as said ruling space;

a second set of grating substantially the same as said first set of grating, positioned such that when said first set of grating is aligned with respect to said series of tick marks, said second set of grating is positioned 90° out of phase with respect to said series of tick marks;

a third set of grating substantially the same as said first set of grating positioned such that when said first set of grating is aligned with respect to said series of tick marks, said third set of grating is positioned 270° out of phase with respect to said series of tick marks; and a fourth set of gratings substantially the same as said first set of gratings, positioned such that when said first set of grating is aligned with respect to said series of tick marks, said fourth set of grating is positioned 180° out of phase with respect to said series of tick marks, such that said first, second, third and fourth set of grating are in quadrature relationship to each other.

26. A system as in claim 23 for marking positions on a moving print medium wherein said sensing means comprises:

a plurality of phototransistors equal in the number to said plurality of patterns, each sensing the position of said image of said moving series of tick marks relative to a different one of said plurality of patterns, and providing a plurality of output signals; and signal processing means for converting said plurality of output signals of said plurality of phototransistors into a plurality of square waveforms, such that each of said square waveform corresponds to one phototransistor, and such that each edge of said square waveform corresponds to a matching of said moving series of tick marks to the pattern to which said phototransistor corresponds.

27. A system as in claim 26 for marking positions on a moving print medium, further comprising exclusive-or means for combining said plurality of square waveforms into a resulting square waveform such that each edge of said resulting square waveform represents a matching of said moving series of tick marks with one of said plurality of patterns.

28. A system as in claim 26 for marking positions on a moving print medium, wherein said plurality of phototransistors are grouped in pairs, each phototransistor pair sensing a pair of patterns within said plurality of patterns, said pattern pair having two patterns being 180° apart from the other, and such that the difference in output signals of each phototransistor pair is provided as one of said output signals of said plurality of phototransistors.

29. A system as in claim 26 of marking positions on a moving print medium, wherein said signal process means comprises:

current integration means for converting output currents of said plurality of phototransistors into a plurality of voltages;

differentiation means to remove DC bias and environmental noise from said plurality of voltages, providing a plurality of AC voltage output signals;

peak detecting means for detecting peaks in said voltage output signals; and signaling means for providing a signal every time a voltage peak is detected by said detecting means.

30. An apparatus for providing a timing means based on sensing a tracking line formed by a series of equally spaced marks printed on a moving printed medium comprising:

first sensor means situated at a first location providing an output signal when said sensor means sense the passing of one of said series of equally spaced mark moved past said first location, such that as said series of equally spaced marks pass said first location at a periodic rate, said first sensor provides a first series of output signals at said periodic rate;

second sensor means substantially the same as said first sensor means situated at a second location such that as said series of equally spaced marks pass said second location at said periodic rate, said second sensor means provides a second series of periodic signals of said periodic rate having a first time lag with respect to said first series of periodic signals by ¼ time period between successive signals of said first series of periodic signals;

third sensor means substantially the same as said first sensor means situated at a third location such that as said series of equally spaced marks pass said third location at said periodic rate, said third sensor means provides a third series of periodic signals of said periodic rate having a second time lag with respect to said first series of periodic signals by ½ the time period between successive signals of said first series of periodic signals;

fourth sensor means substantially the same as said first sensor means situated at a fourth location such that as said series of equally spaced marks passed said fourth location at said periodic rate, said fourth sensor means provides a fourth series of periodic signal at said periodic rate having a third time lag said first series of periodic signals by ¾ the time period of said first series of periodic signals, and such that said first, second, third and fourth series of periodic signals are in quadrature relation with each other; and signal processing means for combining said first, second, third and fourth series of periodic signals in time to provide a fifth series of periodic signals, each signal of said fifth series of periodic signals is generated in response to a signal from said first, second, third, and fourth series of periodic signal, and for providing said fifth series of periodic signal as said timing means.

31. An apparatus for providing a timing means as in claim 30, wherein said first sensor means comprising:

first transparent surface having a pattern formed thereon substantially identical to a section of said series of equally spaced marks, said transparent surface positioned to be adjacent said moving print medium and such that said pattern when viewed behind said transparent surface aligns with said series of equally spaced marks repeatedly as said series of equally spaced marks moves with said moving medium; and first light sensing means responsive to light transmitted through said transparent surface for providing said first series of periodic signals corresponding to peaks of light transmission when said pattern aligns with said series of equally spaced marks; and said second, third and fourth sensor means similarly comprises: second, third and fourth transparent surfaces substantially like said first transparent surface, except said second, third and fourth surfaces positioned so as to achieve said first, second and third time lag and in quadrature relationship with each other; and second, third and fourth light sensing means substantially identical to said first light sensing means.

32. An apparatus as in claim 31, for providing a timing means, wherein said first, second, third and fourth light sensing means provide respectively first, second, third and fourth continuous output signals proportional to the intensity of light received behind said first, second, third and fourth transparent surfaces, and said first, second, third and fourth continuous output signals are in quadrature relationship with each other.

33. An apparatus as in claim 32, for providing a timing means, wherein said signal processing means comprises:

signal difference means for providing a first difference signal proportional to the difference of said first and third continuous output signals and for providing a second difference signal proportional to the difference of said second and fourth continuous output signals;

peak detecting means for providing a first series of peak signals corresponding to the positive and negative peaks of said first difference signal, and for providing a second series of peak signal corresponding to the positive and negative peaks of said second difference signals;

signal combination means for providing said fifth series of periodic signal wherein each signal of said fifth series of periodic signal correspond to a peak signal of said first and second series of peak signals.

34. An apparatus for providing a timing means as in claim 30, further comprising sensing means for providing a SOP signal when a three portion start of plot mark is sensed, such that said fifth series of periodic signal may begin to actuate mechanisms after said SOP signal is provided.

35. A two-portion mark for use on a print medium to indicate to a sensing means of limited range the start of plot of print lines on the print medium, comprising:

a first portion of said mark above a reference line, said portion occupying a first area and said portion extends above said reference line by a first distance greater than said range of said sensing means; and a second portion of said mark beneath the reference line directly following in space the first portion; said second portion extends beneath said reference line by a second distance greater than said range of said sensing means.

36. A mark as in claim 35 wherein said first and second portions of said mark are substantially the same uniform color.

37. A mark as in claim 35 wherein said first and second portions of said mark are rectangular.

38. A mark as in claim 35 wherein said first and second portions of said mark are dark with respect to said print medium.

39. A mark as in claim 35 wherein said first and second distances are the same.

40. A circuit for generating a signal upon recognizing a three-portion start-of-plot mark on a moving print medium, said start-of-plot mark having, in the sequence said mark is being sensed, a first portion substantially above a reference line, a second portion substantially below said reference line, and a third portion substantially above said reference line, said circuit comprising:

first and second sensors each providing an output signal and having a sensing field extending a predetermined distance smaller than the distances by which said second portion of said mark extends below said reference line and first and third portions of said start-of-plot mark extend above said reference line, wherein the mid-point between the centers of said sensing fields of said first and second sensors is located within a second predetermined distance of said reference line.

41. A circuit as in claim 40, further comprising means for computing a quantity proportional to the difference between the output signals of said first and second sensors.

42. A circuit as in claim 41, further comprising:

means for detecting a first peak value, said first peak value being the peak value of said quantity when sad first portion of said mark passes though the sensing fields of said first and second sensors;

means for detecting a second peak value, said second peak value being the peak value of said quantity when said second portion of said mark passes through the sensing fields of said first and second sensors; and means for providing a start-of-plot signal when said quantity equals on-half the difference between said first and second peak values during the period of time when said third portion of said mark passes through the sensing fields of said first and said second sensors.

43. A method for generating a signal upon recognizing a three-portion start-of-plot mark on a moving print medium, said start-of-plot mark having, in the sequence said mark is being sensed, a first portion substantially above a reference line, a second portion substantially below said reference line, and a third portion substantially above said reference line, said method comprising the step of:

providing first and second sensors each producing an output signal and having a sensing field extending a predetermined distance smaller than the distances by which said second portion of said mark extends below said reference line and first and third portion of said start-of-plot mark extend above said reference line, wherein the mid-point between the centers of said sensing fields of said first and second sensors is located within said predetermined distance of said reference line.

44. A method as in claim 43, further comprising the step of computing a quantity proportional to the difference between the output signals of said first and second sensors.

45. A method as in claim 44, further comprising the steps of:

detecting a first peak value, said first peak value being the peak value of said quantity when said first portion of said mark passes through the sensing fields of said first and second sensors;

detecting a second peak value, said second peak value being the peak value of said quantity when said second portion of said mark passes through the sensing fields of said first and second sensors; and providing a start-of-plot signal when said quantity equals one-half the difference between said first and second peak values during the period of time when said third portion of said mark passes through the sensing fields of said first and said second sensors.

46. A three portion mark for use on a print medium to indicate the start of plot of print lines on the print medium, comprising:

first, second and third portions arranged relative to a reference line, wherein said first portion has more area above said reference line than below said reference line;

said second portion has more area beneath said reference line than above said reference line, and said second portion directly follows in space said first portion; and said third portion has more area above said reference line than below said reference line, and said third portion directly follows in space said second portion.

47. A mark as in claim 46, wherein said first, second and third portions of said mark are rectangular.

48. A mark as in claim 46, wherein said first, second and third portions of said mark are dark with respect to said print medium.

49. A mark as in claim 46, wherein said first, second and third portions of said mark are substantially equal in area.

50. A mark as in claim 46 wherein said first portion and said second portion are substantially equal in area.

51. A mark as in claim 46 wherein said third portion and said first portion are substantially equal in area.

52. A mark as in claim 46, wherein said first, second and third portions are of substantially the same uniform color.

* * * * *